United States Patent
Hui et al.

(10) Patent No.: US 7,512,413 B2
(45) Date of Patent: Mar. 31, 2009

(54) SYSTEMS AND METHODS THAT EMPLOY MULTIPLE ANTENNAS WITH A DEVICE FOR MOBILE COMMUNICATION

(75) Inventors: Ping Hui, Richmond (CA); Jari Van Wongterghem, Vancouver (CA); Steve Eggleston, San Diego, CA (US)

(73) Assignee: Nokia Corporation, Espoo (FI)

(*) Notice: Subject to any disclaimer, the term of this patent is extended or adjusted under 35 U.S.C. 154(b) by 971 days.

(21) Appl. No.: 10/453,798

(22) Filed: Jun. 3, 2003

(65) Prior Publication Data
US 2005/0041624 A1 Feb. 24, 2005

(51) Int. Cl.
H04M 1/00 (2006.01)
H01Q 1/24 (2006.01)

(52) U.S. Cl. .......... 455/550.1; 455/553.1; 455/272; 455/286; 343/702; 343/725; 343/700 MS

(58) Field of Classification Search .......... 455/552.1, 455/553.1, 132, 272, 286, 289; 343/702, 343/722, 728, 751, 755, 736
See application file for complete search history.

(56) References Cited

U.S. PATENT DOCUMENTS

| | | | | | |
|---|---|---|---|---|---|
| 2,650,303 | A | * | 8/1953 | Schlesinger | 343/702 |
| 4,691,379 | A | * | 9/1987 | Shizume | 455/319 |
| 5,023,866 | A | * | 6/1991 | De Muro | 370/278 |
| 5,774,502 | A | * | 6/1998 | Belcher et al. | 375/283 |
| 6,011,518 | A | * | 1/2000 | Yamagishi et al. | 343/713 |
| 6,028,564 | A | * | 2/2000 | Duan et al. | 343/818 |
| 6,041,224 | A | * | 3/2000 | Wada | 455/327 |
| 6,046,700 | A | * | 4/2000 | Kitchener et al. | 343/725 |
| 6,069,586 | A | * | 5/2000 | Karlsson et al. | 343/700 MS |
| 6,166,694 | A | * | 12/2000 | Ying | 343/702 |
| 6,204,819 | B1 | * | 3/2001 | Hayes et al. | 343/702 |
| 6,545,642 | B1 | * | 4/2003 | Doub et al. | 343/702 |
| 6,549,170 | B1 | * | 4/2003 | Kuo et al. | 343/702 |
| 6,642,893 | B1 | * | 11/2003 | Hebron et al. | 343/702 |
| 6,657,518 | B1 | * | 12/2003 | Weller et al. | 333/204 |
| 6,662,021 | B2 | * | 12/2003 | Kang et al. | 455/553.1 |
| 6,664,931 | B1 | * | 12/2003 | Nguyen et al. | 343/767 |
| 6,670,923 | B1 | * | 12/2003 | Kadambi et al. | 343/700 MS |
| 6,690,924 | B1 | * | 2/2004 | Jan et al. | 455/90.3 |
| 6,694,150 | B1 | * | 2/2004 | Standke et al. | 455/552.1 |
| 6,822,609 | B2 | * | 11/2004 | Mendolia et al. | 343/700 MS |
| 6,864,841 | B2 | * | 3/2005 | Dai et al. | 343/700 MS |
| 6,957,080 | B2 | * | 10/2005 | Guetre et al. | 455/552.1 |
| 7,026,999 | B2 | * | 4/2006 | Umehara et al. | 343/702 |
| 7,095,372 | B2 | * | 8/2006 | Soler Castany et al. | 343/700 MS |
| 2003/0160724 | A1 | * | 8/2003 | Alexeff et al. | 343/701 |

(Continued)

*Primary Examiner*—Duc M Nguyen
(74) *Attorney, Agent, or Firm*—Harrington & Smith, PC

(57) ABSTRACT

The present invention comprises systems and methods for cellular, PCS, GPS and/or Bluetooth mobile communication (e.g., a mobile telephone). The systems and methods employ a fully integrated dual band IFA/loop CDMA antenna for cellular and PCS communication. Fully integrating the CDMA antenna within a PWB provides for mitigation of lumped elements to establish dual banding, and can provide for reduced antenna size, device size, cost and interference form a user's hand. The IFA antenna is configured to transmit and receive within the cellular frequency band via a capacitive tap, and the loop antenna is configured to transmit and receive within the PCS frequency band via an impedance matching stub and ground location. The system and methods further employ a firewall to mitigate antenna coupling, and a metal reflector to reduce the electromagnetic reflection, and improve antenna gain and efficiency.

36 Claims, 32 Drawing Sheets

U.S. PATENT DOCUMENTS

2003/0164800 A1* 9/2003 Jordan et al. ................. 343/713
2004/0027289 A1* 2/2004 Huang ................. 343/700 MS
2004/0196179 A1* 10/2004 Turnbull ................. 342/357.06
2004/0212545 A1* 10/2004 Li et al. ..................... 343/866

* cited by examiner

SYSTEMS AND METHODS THAT EMPLOY MULTIPLE ANTENNAS WITH A DEVICE FOR MOBILE COMMUNICATION

TECHNICAL FIELD

The present invention generally relates to mobile communication devices, and more particularly, to a mobile communication device that employs a dual band IFA/loop CDMA antenna for cellular and PCS communication, a GPS antenna and a firewall to mitigate coupling between antennas.

BACKGROUND OF THE INVENTION

Early mobile communication devices employed analog radio transmission such as Advanced Mobile Phone System (AMPS), for example. Such analog technologies were sufficient for an emerging mobile communications consumer market. However, within a relatively short period of time, millions of new mobile communications subscribers, demanding more and more airtime, pushed the existing analog technology to a capacity limit or ceiling. As a consequence, dropped calls and busy signals became common, which fueled a demand for an improved mobile communication network.

In response to the demand, industry developed digital wireless technologies that could accommodate the increased network traffic within a limited amount of radio spectrum. For example, technologies such as Global System for Mobile (GSM) employing Time Division Multiple Access (TDMA) were developed, wherein a time-sharing protocol was employed to provide three to four times more capacity than the existing analog technologies. In general, TDMA employs a technique wherein a communication channel is divided into sequential time slices. Each user of a channel is provided with a time slice for transmitting and receiving information in a round-robin manner. For example, at any given time "t," a user is provided access to the channel for a short burst. Then, access switches to another user who is provided with a short burst of time for transmitting and receiving information. The cycle of "taking turns" continues, and eventually each user is provided with multiple transmission and reception bursts.

Shortly after TDMA was introduced, Code Division Multiple Access (CDMA) was developed, and represented an enhanced solution to the analog transmission deficiencies. Code Division Multiple Access provides for "true" sharing, wherein one or more users can transmit and receive concurrently. Code Division Multiple Access provides sharing via employing spread spectrum digital modulation, wherein a user's stream of bits is encoded and spread across a very wide channel in a pseudo-random fashion. The receiver is designed to recognize and undo the randomization in order to collect the bits for a particular user in a coherent manner. Code Division Multiple Access provides approximately ten times the capacity of the analog technologies, and enables increased voice quality, broader coverage and increased security. Today, CDMA is the prevalent technology employed in mobile systems.

Technological advances in the electronics and computer industries, including smaller components, reduced power consumption, and the Internet, for example, have driven the mobile communications industry to further GSM and CDMA technologies, and to explore other technologies. One such improvement includes EDGE (Enhanced Data-Rates for GSM Revolution) technology. The evolution of GSM to EDGE mitigates various issues associated with voice traffic bandwidth and provides higher data throughput, affording for more efficiency and higher performance. For example, EDGE provides for data rates up to 384 Kbps (with a bit-rate up to 69.2 Kbps per timeslot) over broadband. In addition, EDGE provides for more robust services such a Short Message Service (SMS) and Multimedia Message Service (MMS) for messaging, XHTML (including WAP) browsing, Java applications, FM radio reception, video streaming, and voice and image recording technologies.

Another result of continued efforts to improve the mobile communications includes the International Telecommunications Union's adoption of an industry standard for third-generation (3G) wireless systems that can provide high-speed data rates (e.g., for data transmission and Internet use) and new features. Currently, three operating modes (CDMA2000, WCDMA and TD-SCDMA) based on CDMA technology are being developed. CDMA2000 technology provides a relatively simple, quick, and cost effective path to 3G service. CDMA2000 1× technology supports voice and data services over a standard CDMA channel. Additionally, it provides up to twice the capacity (e.g., peak data rates up to 153 kbps and projected peak data rates up to 307 kbps, without compromising voice capacity) of the earlier CDMA networks. The additional capacity accommodates the continuing growth in the wireless Internet market. Moreover, CDMA2000 1× provides longer standby times and is backwards compatible. CDMA2000 1× EV-DO technology provides a data optimized version of CDMA2000 with peak data rates over 2 Mbps and an average throughput of over 700 kbps, which is comparable to DSL and can support video streaming and large file downloads. WCDMA and TD-SCDMA represent more complex enhancements that can entail more costly and complex components, new network designs, and longer verification and validation periods.

Current technologies within the global mobile communication community include cellular, Personal Communication Service (PCS) and Global Personal Systems (GPS), for example. Cellular communication is typically associated with frequencies around 850 MHz. Personal Communication Service is typically associated with frequencies around 1900 MHz. Global Personal System is typically associated with frequencies around 1600 MHz.

Recent obstacles in the mobile communications domain include producing mobile communications products comprising a combination of technologies. For example, a consumer can concurrently subscribe to more than one service such a cellular and PCS services. Rather than having to obtain multiple devices, wherein each device accommodates an individual service, the consumer may desire one device that is capable of satisfying multiple services. In another example, an individual product that is adequate for a particular subscribed service (e.g., cellular) can become inadequate if the consumer decides to cancel the service and subscribe to a different service (e.g., PCS). The foregoing examples depict two services, however a consumer may desire a mobile communication device that provides cellular, PCS, GPS and/or Bluetooth technologies for communication over GSM, GPRS (General Packet Radio Service) and/or EDGE networks.

Combining technologies into a mobile communication device can additionally increase product size, via implementing various antennas, switching circuitry and processing technology, in a market that demands size reduction. In addition, providing multiple antennas can introduce interference via antenna coupling and re-radiating signals, which can degrade system performance and increase static in a market that demands clearer communication and less drop offs.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods for a mobile communication device, such as a mobile terminal (for example a wireless telephone), that provides for cellular, PCS and GPS mobile communication, and information exchange with devices such as printers, computers, automobile audio systems and wireless headphones, for example. The present invention employs a novel and improved design comprising a dual band IFA/loop CDMA antenna for cellular and PCS communication, a GPS antenna for GPS communication and a Bluetooth antenna for information exchange with other devices employing Bluetooth technology. The present invention employs system and methods that reduce antenna and device size, cost, components and user hand interference, improves reception and reliability and efficiency.

In one aspect of the present invention, a CDMA antenna can be fully integrated with a PWB to provide for dual banding, antenna compaction, reduction of components and cost, electromagnetic shielding, and improved performance. The CDMA antenna can comprise an IFA antenna and a loop antenna for dual banding. Conventional systems generally employ lumped elements for dual banding. Mitigating lumped elements can reduce footprint and cost via eliminating the lumped elements, and improve performance since lumped elements can be lossy.

The IFA antenna (e.g., quarter wavelength) can be configured to transmit and receive cellular information and the loop antenna (e.g., half wavelength) can be configured to transmit and receive PCS information. Configuring the IFA antenna generally comprises employing a capacitive tap. In general, one end of the tap is coupled to ground and the other end resides proximate and separated from the IFA antenna. The capacitive tap can additionally improve cell band peak gain and reduce interference from a user's hand. Conventionally, open-ended configurations are employed, which can lead to greater susceptibility to interference from a user's hand. The loop antenna can be configured via antenna loop size, which can be determined by the ground location, and an impedance matching stub.

In another aspect of the present invention, a GPS antenna and a firewall can additionally be integrated with the PWB to provide for GPS communication and mitigation of antenna coupling, respectively. The GPS antenna comprises at least a radiator, a carrier, mounting locations, a GPS Gamma match, a spring contact point and a spring contact. Generally the GPS antenna is partially integrated with the PWB, whereby the radiator, carrier and spring contact reside in an off-board assembly, which is coupled to the on-board GPS Gamma match and spring contact point. Additionally, the mounting locations facilitate coupling the off-board assembly on the PWB. The spring contact point provides a single connection point to facilitate IFA antenna construction. The single connection point reduces the number of connection points (which can improve reliability) typically employed by conventional systems. The firewall can be employed to mitigate coupling between the PCS antenna and the GPS antenna.

In yet another aspect of the present invention, a Bluetooth antenna can additionally be integrated with the PWB to provide for information exchange with other devices employing Bluetooth technology. As known, Bluetooth technology can be utilized to link devices such as mobile communications devices (e.g., mobile phones and cell phones), wireless headsets, PDA's, other handhelds, computers, printers, copiers, facsimiles, scanners, and/or vehicle audio systems.

In other aspects of the present invention, the systems and methods can be employed in various mobile communications environments and associated with various physical components. For example, the systems and methods can be employed in devices utilized in environments that comprise other mobile communication devices, cellular stations, towers or transceivers, PCS stations towers or transceivers, GPS towers, transceivers or satellites, and wireless networks coupling components employing Bluetooth technology and Wi-Fi/WLAN. In another example, the systems and methods can be employed with ergonomic housings, various features (e.g., displays and controls), electromagnetic shielding reflectors, various PWB characteristics and cover plates.

To the accomplishment of the foregoing and related ends, certain illustrative aspects of the invention are described herein in connection with the following description and the annexed drawings. These aspects are indicative, however, of but a few of the various ways in which the principles of the invention may be employed, and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
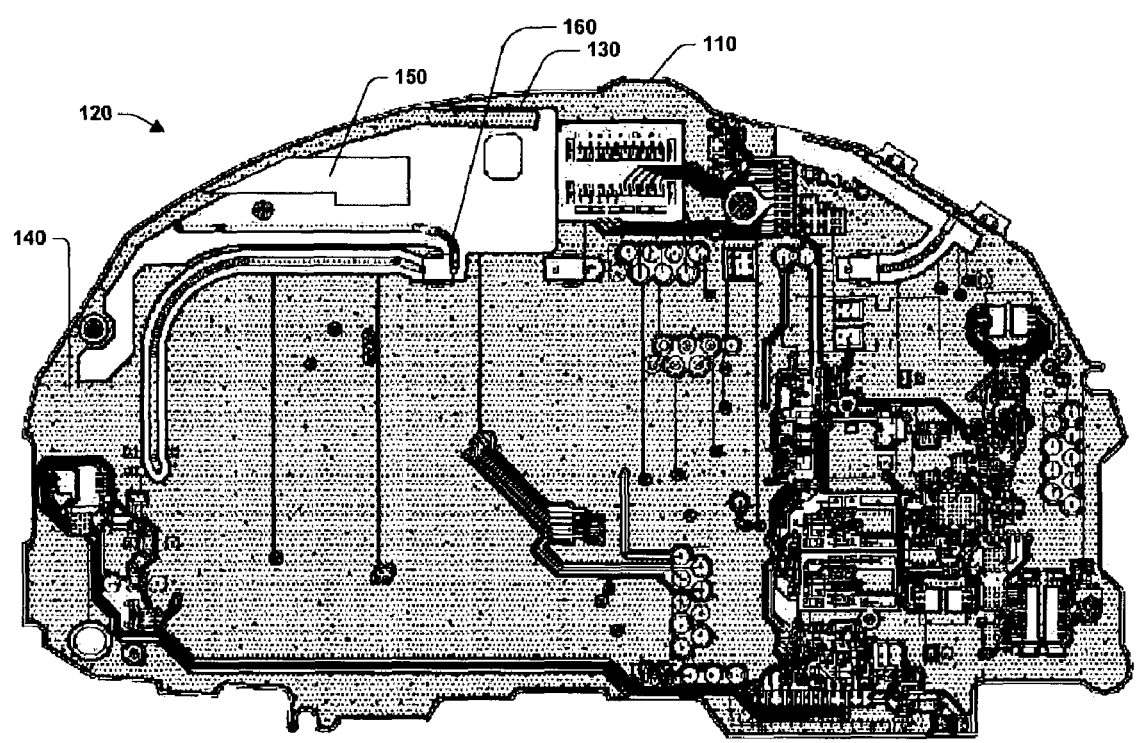
FIG. 1 illustrates an exemplary mobile communication PWB comprising a fully integrated dual frequency IFA/loop CDMA antenna for cellular and PCS communication, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention relates to systems and methods for mobile communication devices that provide cellular, PCS, GPS and/or Bluetooth communication. In general, the systems and methods employ a fully integrated dual band IFA/loop CDMA antenna for cellular and PCS communication, a GPS antenna for GPS communication, a Bluetooth antenna for information exchange with other devices employing Bluetooth technology, a firewall to mitigate coupling between antennas and to allow antennas to be constructed in close proximity to another, and/or a reflector to increase performance. The present invention provides for improvements such as reduced antenna footprint, device size, cost, and interference from a user hand, and increased performance, reliability and efficiency.

Referring to FIG. 1, an exemplary mobile communication device PWB 110 is illustrated. The PWB 110 comprises a dual frequency CDMA antenna ("CDMA antenna") portion 120, a capacitive tap 130 to facilitate tuning the IFA antenna $120_1$, a ground 140 that can additionally be utilized to tune the loop antenna $120_2$, a PCS matching stub 150 to facilitate tuning the loop antenna $120_2$, and a feed 160.

The PWB 110 (e.g., a Printed Circuit Board, or PCB) typically comprises a non-conducting substrate (e.g., fiberglass with epoxy resin) upon which a conductive pattern is formed. The conductive pattern is typically constructed with copper, however it is to be appreciated that other conductive material such as nickel, silver, tin, tin-lead, gold and the like can be utilized, for example concurrently as etch-resists and/or top-level metal. In addition, the conductive pattern can be formed on multiple layers, and the layers can be connected with vias to reduce ohmic losses.

The PWB 110 can be a single or a double sided, or a multilayered board populated with passive and active circuitry via surface and/or wire mount and metal shield boxes. The components can include resisters, capacitors, inductors, solid state devices such as transistors and operational amplifiers, multi-layered components such as Application Specific Integrated Chips (ASICs) with analog, digital and/or RF layers, and the like. The PWB 110 can be manufactured to be rigid and/or flexible, and can be installed into devices such a wireless communication devices and/or mobile telephones.

The CDMA antenna 120 can be fully integrated within the PWB 110 (e.g., the CDMA antenna can be part of the PWB 110). Full integration allows antenna size reduction, or reduced antenna footprint, which is advantageous particularly as technology evolves and electronic components and devices, including mobile phones, reduce in size. In addition, fully integrating the CDMA antenna 120 provides for additional shielding (e.g., via the PWB 110) to reduce electromagnetic emission in the direction of the user, thus reducing the interference caused by the user. Furthermore, the location of the CDMA antenna 120 on the PWB 110 can be designed to position the CDMA antenna 120 to reduce interference due to the user's hand (e.g., the "hand affect").

Figure 2:
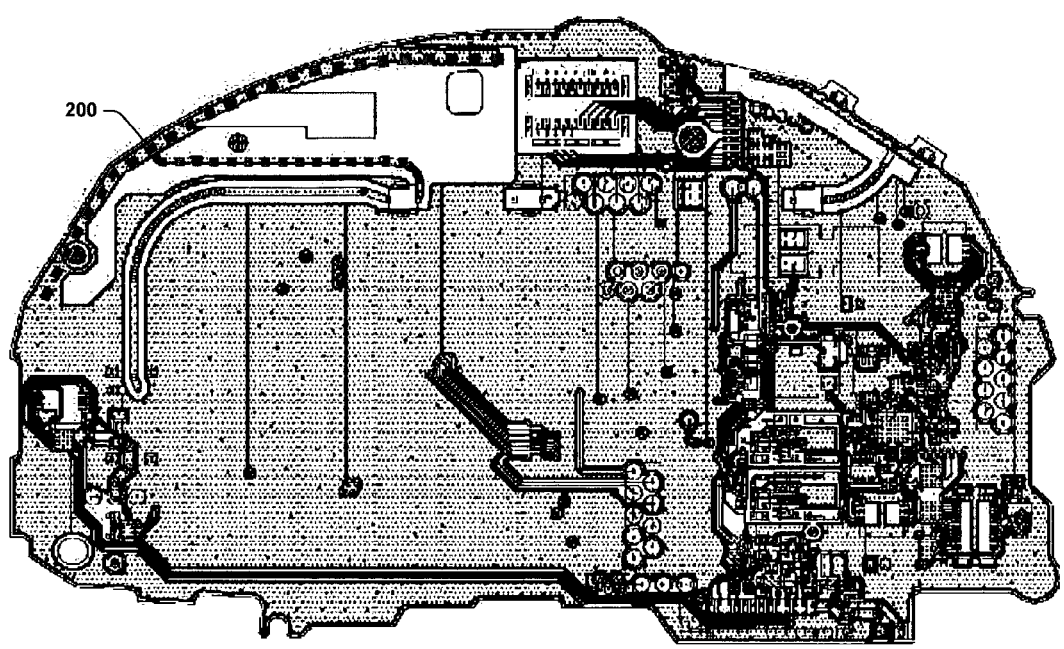
FIG. 2 provides an approximate region on a PWB where an IFA antenna of a dual frequency IFA/loop CDMA can reside, for explanatory purposes.
Figure 3:
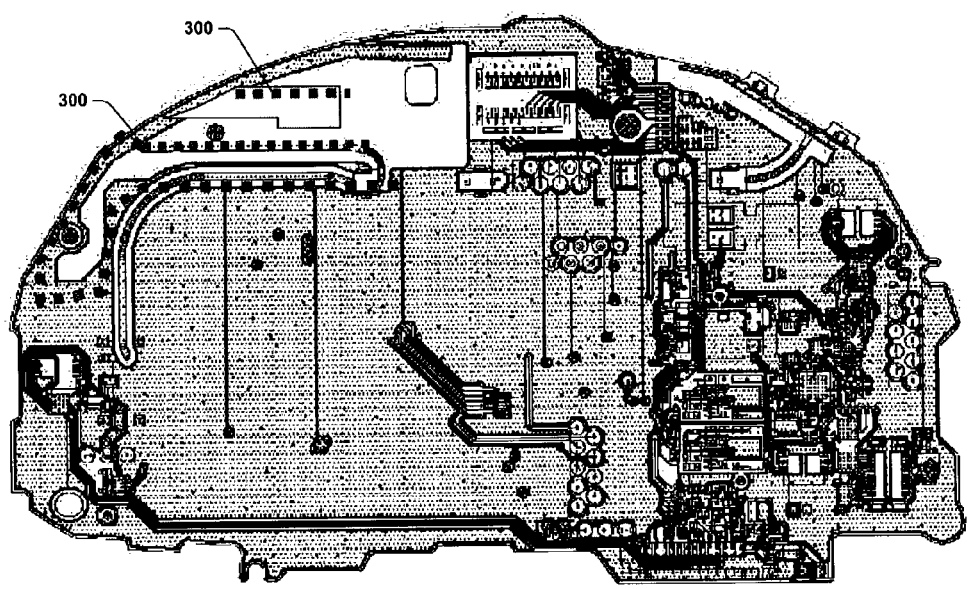
FIG. 3 provides an approximate region on a PWB where a loop antenna of a dual frequency IFA/loop CDMA can reside, for explanatory purposes.

The fully integrated CDMA antenna 120 comprises an IFA antenna and a loop antenna. Briefly turning to FIGS. 2-3, the approximate location of the IFA antenna and the loop antenna on the PWB 110 is illustrated. Depicted in FIG. 2 at 200 (via the dotted line) is the approximate location of the IFA portion of the CDMA antenna 120. Depicted in FIG. 3 at 300 (via the dotted line) is the approximate location of the loop portion of the CDMA antenna 120. It is to be appreciated that FIGS. 2-3 are provide for illustrative purposes, and do not limit the invention. For example, the location of the IFA and loop antennas can vary from the locations presented in FIGS. 2-3.

Returning to FIG. 1, the CDMA antenna 120 can be employed as a dual band antenna, wherein the IFA antenna can be configured for a first frequency band and the loop antenna can be configured for a second frequency band. Conventional systems typically achieve dual banding via lumped elements, which can be lossy, and can degrade performance. Employing the fully integrated IFA-loop CDMA antenna 120 mitigates employing lumped elements to form a dual frequency antenna. Thus, employing the CDMA antenna 120 can reduce cost, increase reliability and improve efficiency by mitigating the lumped elements to construct a dual frequency antenna.

The IFA antenna is typically configured to transmit and receive signals within the cellular band and the loop antenna is typically configured to transmit and receive signals within the PCS band. In general, the IFA antenna is configured for cellular transmission and reception via the capacitive tap 130. The capacitive tap 130 can be formed by designing a conductive structure that is proximate (separated by an air gap) the IFA antenna. As known, the surface area of two adjacent conducting plates separated by an air gap is associated with a capacitance that is a function of the area of the conductive plates. As such, the length of the capacitive tap, and hence the capacitance, can be designed to tune the IFA antenna to resonate within the cellular frequency band. Additionally, the capacitive tap can improve cell band peak gain, renders a more compact antenna and reduces interfernce from a user's hand. Conventional, open-ended configurations are employed, and thus the foregoing advantages of the capacitive tap are not realized.

As noted above, the loop antenna is typically configured to transmit and receive signals within the PCS band. The loop antenna can be configured via the ground 140 location and the impedance matching stub 150. The location of the ground 140 can affect the size and shape of the loop, and the impedance matching stub 150 can be employed to match antenna impedance (e.g., 50Ω). The flexibility of loop antenna architecture provides for implementation within variously shaped mobile communication footprints.

The IFA antenna and the loop antenna-can share the ground 140, which is typically associated with the PWB 110 ground plane. Additionally, the IFA antenna and the loop antenna can share the feed 160 of the CDMA antenna 120.

FIGS. 4-8 illustrate an exemplary GPS antenna assembly, a portion of the PWB 110 comprising a GPS antenna assembly mounting mechanism, and the portion of the PWB 110 with the GPS antenna assembly mounted thereon, respectively.

Figure 4:
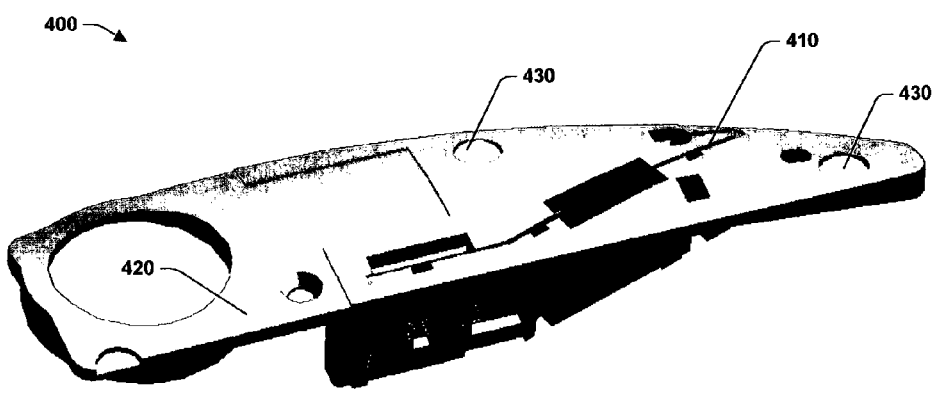
FIG. 4 illustrates a first view of an exemplary GPS antenna assembly, in accordance with an aspect of the present invention.

Proceeding to FIG. 4, an exemplary GPS antenna assembly 400 is illustrated. The GPS antenna assembly 400 comprises at least a radiator 410, a carrier 420 and mounting locations 430. Typically, the radiator 410 is constructed of metal such as sheet metal, for example. The radiator 410 can be embedded within the carrier 420 such that it can be exposed from a plurality of sides of the carrier 420, including the side mounted away from the PWB 10. The radiator 410 can be employed to receive signals within the GPS frequency band. The carrier 420 (e.g. plastic and the like) generally facilitates mounting the GPS antenna assembly 400 to the PWB 110. The mounting locations 430 provide a means to fasten the GPS antenna 400 to the PWB 110. For example, mounting components such as stand offs, screws, snaps, clips, solder joints, connectors, wires and the like can be employed in connection with the mounting locations to selectively secure the GPS antenna assembly 400 to the PWB 110.

Figure 5:
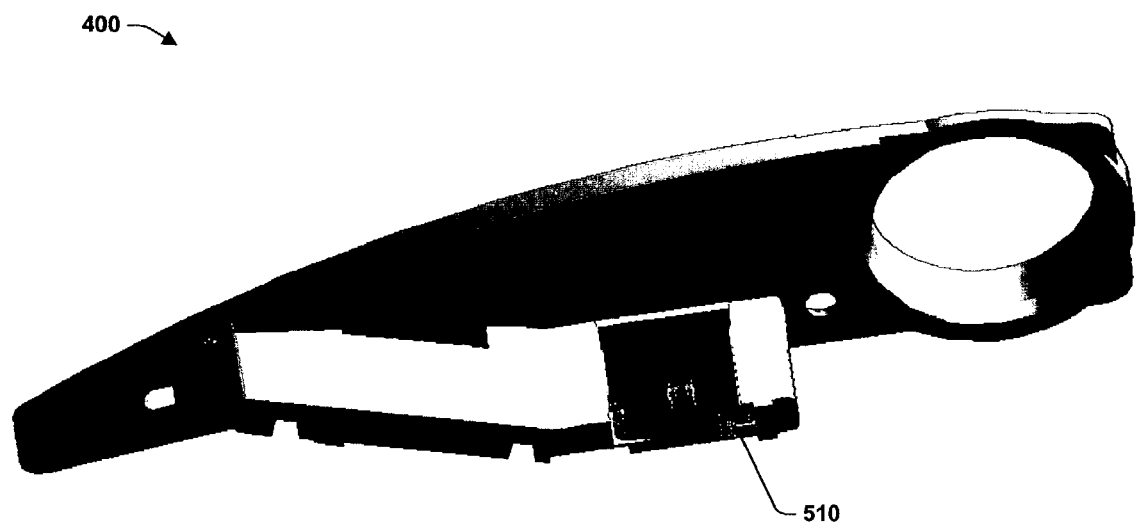
FIG. 5 illustrates a second view of the exemplary GPS antenna assembly, in accordance with an aspect of the present invention.

FIG. 5 illustrates the exemplary GPS antenna assembly 400 from a second viewing angle. As depicted, the exemplary GPS antenna assembly 400 further comprises a spring contact 510 associated with the radiator 410. The spring contact 510 can be employed as a single contact point to facilitate mounting the GPS antenna assembly 400 and the IFA antenna to the PWB 110.

Figure 6:
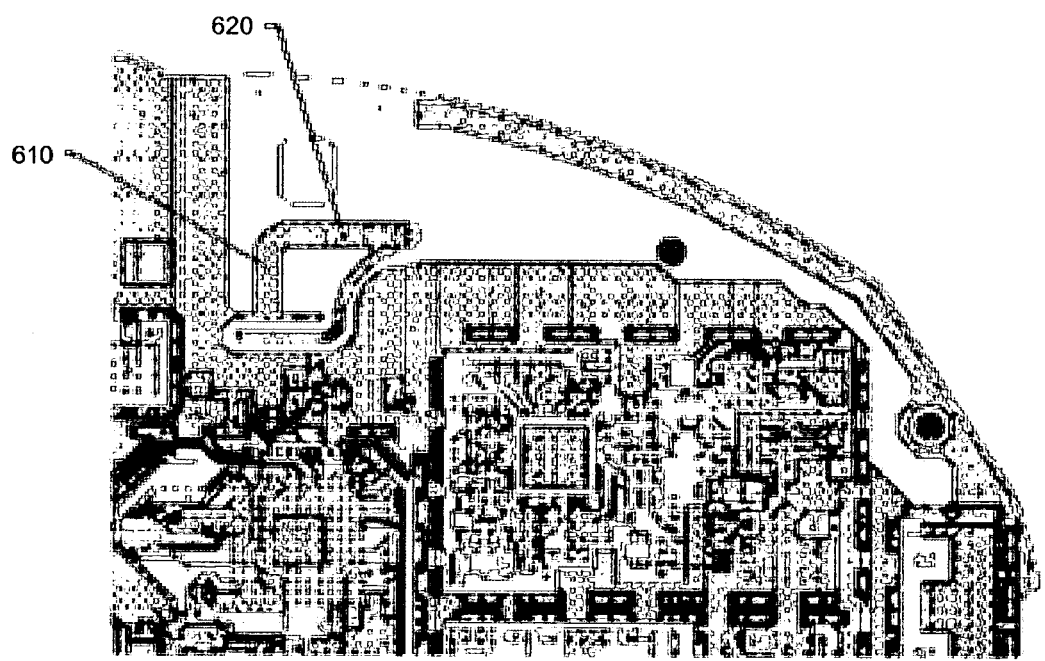
FIG. 6 illustrates a portion of the exemplary PWB with a GPS antenna mounting mechanism for a GPS antenna, in accordance with an aspect of the present invention.

FIG. 6 illustrates a portion of the PWB 110 comprising a GPS antenna mounting mechanism that is utilized in connection with the GPS antenna assembly 400. The GPS antenna mounting mechanism comprises a GPS gamma match ("F") 610 that comprises a spring contact point 620. The GPS gamma match 610 can be employed to impedance match the GPS antenna assembly 400 and to facilitate coupling the GPS antenna assembly 400 and the IFA antenna to the PWB 110. The GPS Gamma match 610 provides a single connection point, or the spring contact point 620. Conventionally, two or more connection points are employed, thus the present invention can improve reliability via mitigating the number of connection points. In addition, and unlike conventional designs, the GPS gamma match 610 on the PWB 110 can be easily modified, even after the design of the GPS assembly 400. Furthermore, it is to be appreciated that the foregoing can be utilized with various other IFA antenna configurations, for example the configurations described below.

Figure 7:
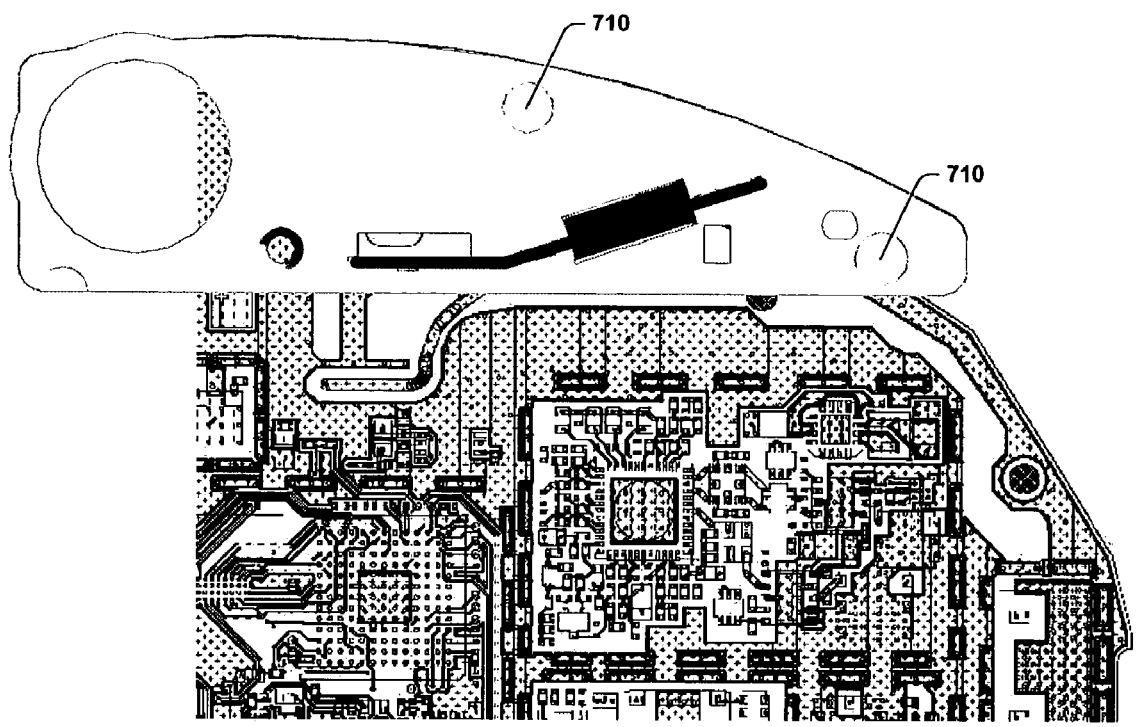
FIG. 7 illustrates a portion of the exemplary PWB with a GPS antenna, in accordance with an aspect of the present invention.

FIG. 7 illustrates a portion of the PWB 110 with the GPS antenna assembly 400 mounted thereon via a mounting mechanism 710. The mounting mechanism 710 can comprise various known mounting components such as the fastening and securing mechanisms described previously. The mounting mechanism 710 can be employed to secure the GPS antenna assembly 400 to the PWB 110.

Figure 8:
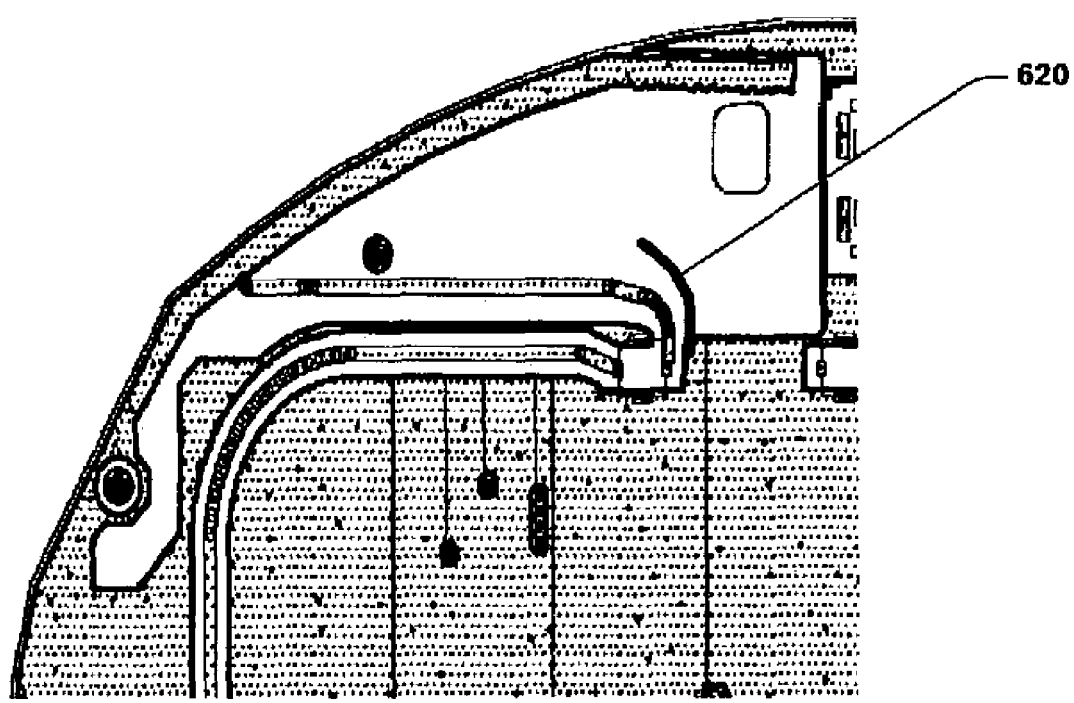
FIG. 8 illustrates a portion of the PWB with a coupling mitigating firewall, in accordance with an aspect of the present invention.

FIG. 8 illustrates a portion of the PWB 110 further comprising a firewall 810. In general, the firewall 810 is configured with a conductive trace (e.g., copper) of suitable length (e.g., 8 mm) with one end connected to ground and the other end left open, and formed between two antennas to reduce antenna mutual coupling. For example, the firewall 810 can be formed between the GPS antenna 400 and a PCS antenna to reduce antenna mutual coupling. For example, without the firewall 810. PCS signal power from the PCS antenna can couple (e.g., inductively) to a GPS antenna 400, wherein the power can be re-radiated via the GPS antenna 400. Under such circumstances, the GPS antenna 400 behaves as a parasitic radiator at the PCS band, and can increase scattered electromagnetic interference, lower peak gain, diminish performance, and reduce efficiency due to increased dielectric losses associated with the parasitic radiator. The firewall 810 can be employed to mitigate the foregoing coupling, which can reduce scattered electromagnetic interference, increase peak gain, improve efficiency, and can increase performance.

It is to be appreciated that the foregoing example is provided for illustrative purposes, and that the invention is not so limited. As noted above, the firewall 810 can be employed between any two antennas, including the antennas described herein, to reduce antenna mutual coupling. Thus, antenna can be constructed in close proximity without interfering with each other, providing for PWB and device compaction, or size reduction. In addition, the firewall shape, length and/or orientation can be variously configured, depending on the application(s).

Figure 9:
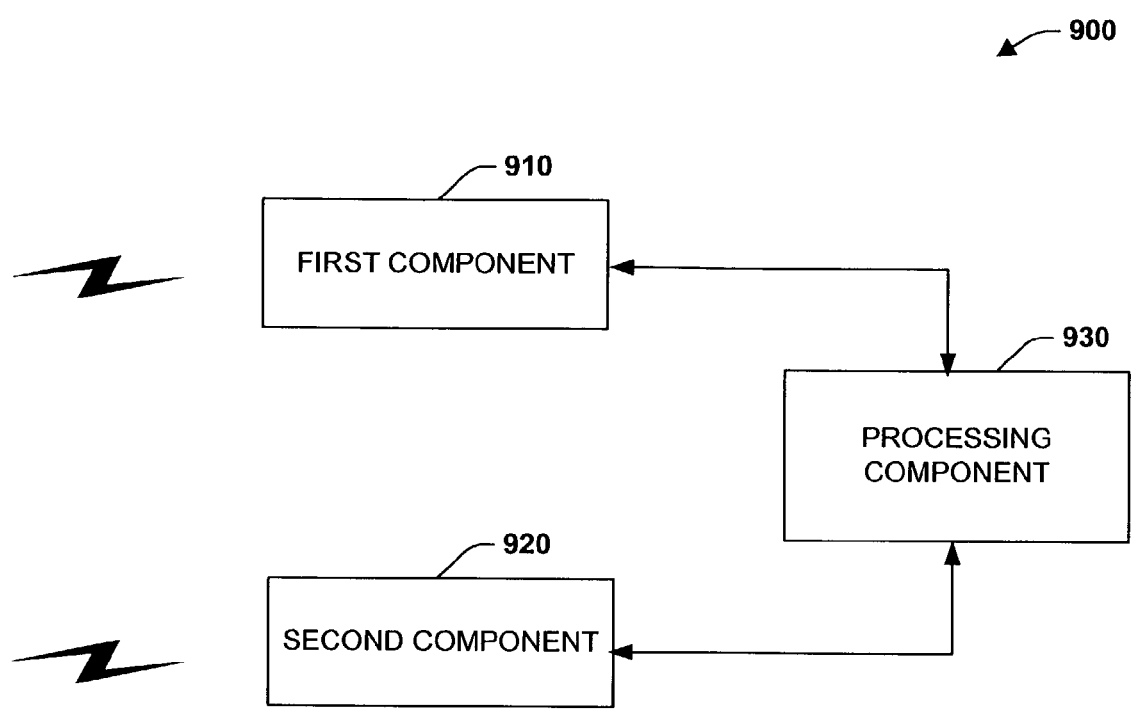
FIG. 9 illustrates an exemplary cellular/PCS mobile communication system, in accordance with an aspect of the present invention.

Proceeding to FIG. 9, a system 900 that can transmit and receive frequencies associated with the mobile communication frequency bands is illustrated. The system 900 comprises a first component 910, a second component 920, and a processing component 930, wherein the components 910 and 920 can be configured to resonate at different frequencies such that the system 900 can be configured as a dual frequency transceiver. Additionally, and as described in connection with FIGS. 10-11, the system 900 can employ additional components to transmit and receive signals in additional frequency bands and to facilitate mitigation of coupling between antennas.

The components 910 and 920 can be antennas and/or other devices that can be employed to transmit and receive signals. For example, components 910 and 920 can be configured as an Inverted-F antenna (IFA) and loop antenna, respectively, to construct a dual frequency cellular/PCS antenna for transmitting and receiving signals associated with the cellular and PCS frequency bands. In addition, various other antenna configurations can be employed. For example, a Planar Inverted-F, a spiral, an "L" shaped, and "E" shaped and/or a meandered antenna can be employed in accordance with an aspect of the present invention.

Typically, the frequency bands associated with the components 910 and 920 can be selected by configuring tuning circuitry to resonate around desired frequency bands and/or at multiples of desired frequencies. The tuning circuitry can include capacitive, inductive and/or resistive elements, including capacitive taps, impedance matching stubs and various grounding configurations. In one aspect of the present invention, the component 910 (or component 920) can be configured to transmit and receive information associated with the cellular (e.g., around 850 MHz) band and component 920 (or component 910) can be configured to transmit and receive information associated with the Personal Communication System, or PCS (e.g., around 1900 MHz) frequency band.

In other aspects of the present invention, components 910 and 920 can be configured to transmit and receive signals in various other frequency bands. For example, components 910 and 920 can be configured to transmit and receive analog and/or digital signals, including signals within the Digital Communication System, DCS (e.g., around 1710-1880 MHz), the Universal Mobile Telecommunication System, or UTMS (e.g., around 1920-2170 MHz) and/or Global Positioning Service, GPS (e.g., around 1600 MHz) frequency bands. Furthermore, components 910 and 920 can be configured to transmit and receive signals within a similar frequency band.

The system 900 can be utilized as a Code Division Multiple Access (CDMA) antenna, to construct a CDMA antenna and/or in connection with a CDMA antenna, for example the CMDA antenna 120. However, it is to be appreciated that various other technologies can be employed in connection with components 910, 920 and 930. For example, technologies such as Time Division Multiple Access (TDMA), Global System for Mobile (GSM), and evolutions of CMDA such as CDMA2000, WCDMA and TD-SCDMA can be employed.

In addition, the system 900 can be integrated with other components. For example, components 910 and/or 920 can be fully integrated within a PWB (e.g., the PWB 110). Fully integrating the components 910 and 920 can provide for board size reduction and decreased interference between components. In other aspects of the present invention, the components 910 and/or 920 can be partially integrated components within the PWB. Additionally, providing a fully integrated dual frequency CDMA architecture facilitates mitigating employing lumped elements (e.g., RCL: circuitry) to form a dual frequency antenna, and thus can reduce the cost associated with the lumped elements. Additionally, a fully integrated dual frequency CDMA architecture can improve reliability and efficiency since lumped elements can be lossy.

Figure 10:
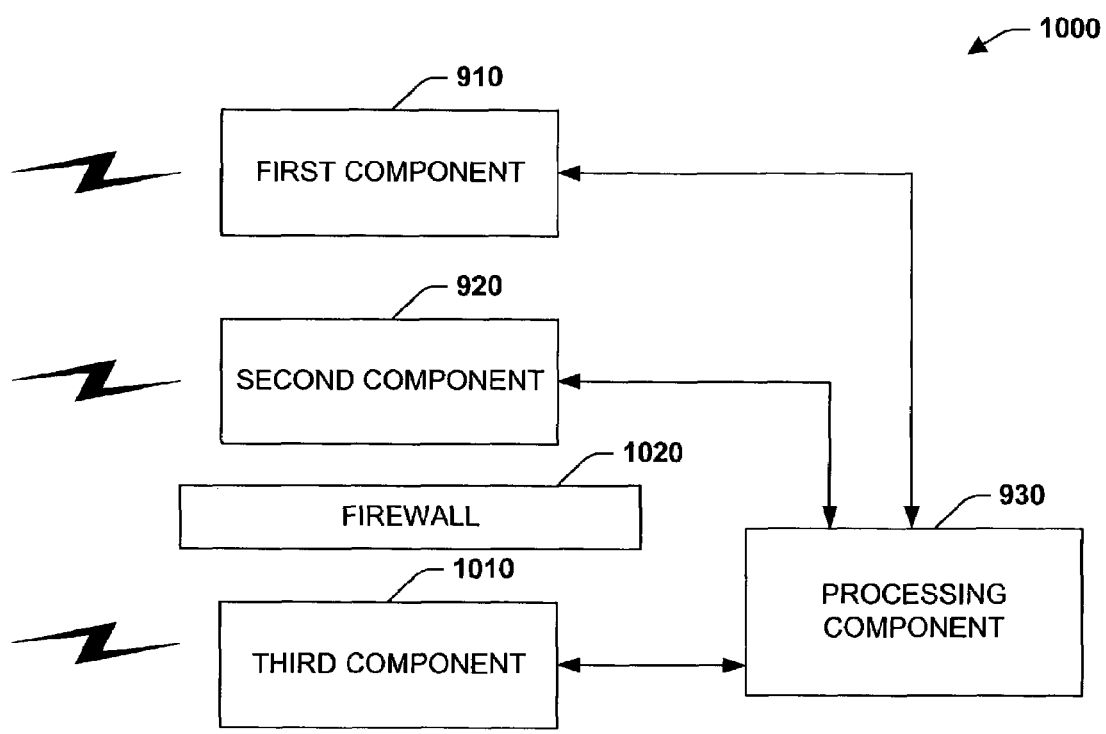
FIG. 10 illustrates an exemplary cellular/PCS/GPS mobile communication system, in accordance with an aspect of the present invention.

In general, after receiving information, the component 910 and/or the component 920 can convey the information to a processing component 930 and/or other component that can facilitate displaying at least a portion of the information, generating an audio signal associated with at least a portion of the information and feeding the audio signal to an audio device such as a speaker, and/or providing further processing, for example. To transmit information, the processing component 930 and/or other component(s) typically provide information to the components 910 and/or 920. For example, a user can employ an alphanumeric pad and/or touch screen technology to provide information that can facilitate communication with another device and/or information to transmit to another device. The processing component 930 can facilitate conveying the information to the component 910 and/or 920 and facilitate transmission FIG. 10 illustrates a system 1000, comprising the system 900 and further comprising a third component 1010 and a firewall 1020 to mitigate coupling between at least one of the components 910-920 and the component 1010.

Similar to the components 910 and 920, the component 1010 can be designed to transmit and receive signals within a frequency band. Typically, the component 1010 is configured to transmit and receive signals within a frequency band that is different from the frequency bands associated with the components 910 and 920. For example, whereas the components 910 and 920 may be associated with the cellular and PCS frequency bands, the component 1010 is typically configured to transmit and receive signals within the GPS frequency band. However, it is to be appreciated that the component 1010 can be tuned to resonate at any of the frequency bands described herein. Like the components 910 and 920, the component 1010 can be coupled to the processing component 930, which can facilitate transmission and reception of information.

The firewall 1020 can be employed to reduce interference between at least one of the components 910-920 and the component 1010. As described supra, PCS signal power can couple to a GPS antenna, which can re-radiate the power and diminish performance. The firewall 1020 can mitigate coupling between the PCS and GPS bands, and thus decrease scatter electromagnetic interference, and increase peak gain and performance, and enable close placement of antennas.

Figure 11:
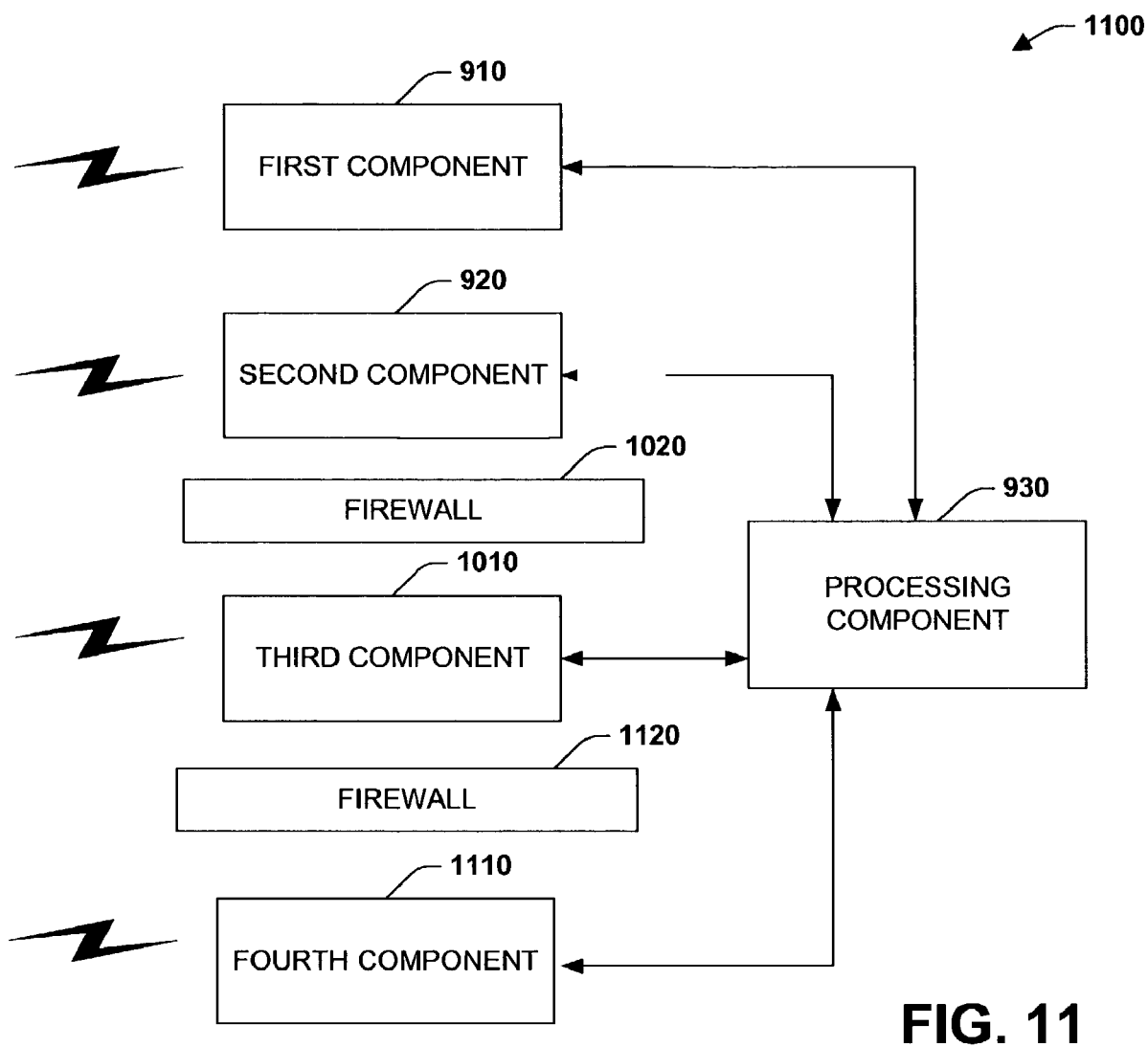
FIG. 11 illustrates an exemplary cellular/PCS/GPS/Bluetooth mobile communication system, in accordance with an aspect of the present invention.

FIG. 11 illustrates a system 1100, comprising the system 1000 and further comprising a fourth component 1110 employing Bluetooth technology to communicate at least one other device employing Bluetooth technology and an optional second firewall 1120. As known, Bluetooth technology can be utilized to link devices such as mobile phones and computers Via wireless network (e.g., a personal area network). For example, the component 1110 can be employed to provide communication between the system 1100 and devices employing Bluetooth technology such as a wireless headset, a PDA, a computer, a printer, a copier, a facsimile, a scanner and a vehicle's audio system. The optional second firewall 1120 can be employed in connection with the fourth 1110 component to mitigate coupling between the fourth component 1110 and the first component 910, the second component 920 and/or the third component 1010, if desired.

Figure 12:
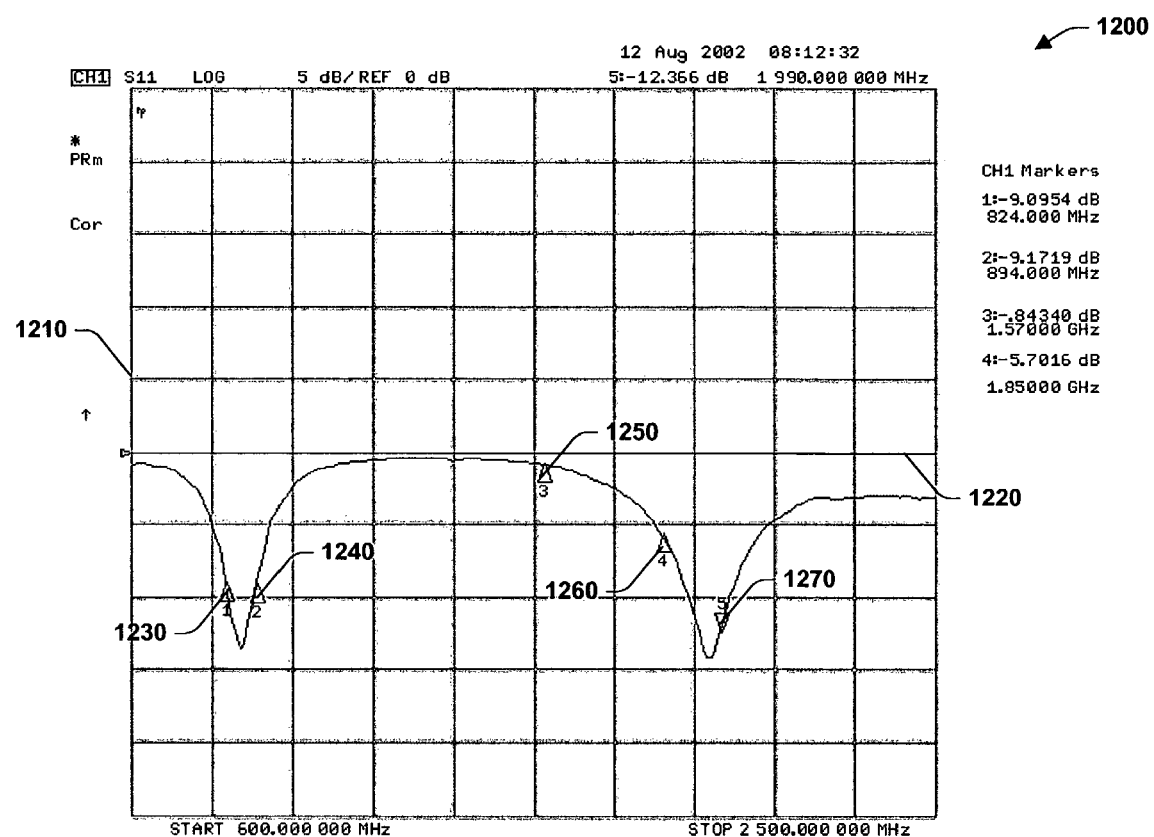
FIG. 12 illustrates an exemplary return loss graph, in accordance with an aspect of the present invention.

FIG. 12 provides an exemplary return loss graph 1200 comprising return loss in decibel units (dB) as a function of frequency, including the cellular and PCS frequency bands, in accordance with an aspect of the present invention. As known, the return loss is a measure of impedance mismatch, and can be expressed in terms of a ratio of the fractional amount of signal reflection caused by an impedance mismatch. It is to be appreciated that the graphical representation of the return loss provides one example over various frequencies and does not limit the invention.

The return loss graph 1200 depicts a vertical axis 1210 with a dB range from −25 dB to 25 dB, in increments of 5 dB per reference tick, and a horizontal axis 1220 with a frequency range from 600 MHz to 2600 MHz, in increments of 200 MHz per tick. The return loss graph 1000 further depicts measurements from frequencies of 600 MHz to 2500 MHz. As illustrated, at 1230, 824 MHz corresponds to a return loss of −9.0354 dB. At 1240, 894 MHz corresponds to a return loss of −9.1719 dB. At 1250, 1570 MHz corresponds to a return loss of −0.8434 dB. At 1260, 1850 MHz corresponds to a return loss of −5.7016 dB. At 1270, 1990 MHz corresponds to a return loss of about −12.366 dB. The return loss graph 1200 illustrates that for the example depicted herein the return loss, or the reflection due to impedance mismatch, improves in the frequency bands corresponding to the cellular and PCS frequency bands.

Figure 13:
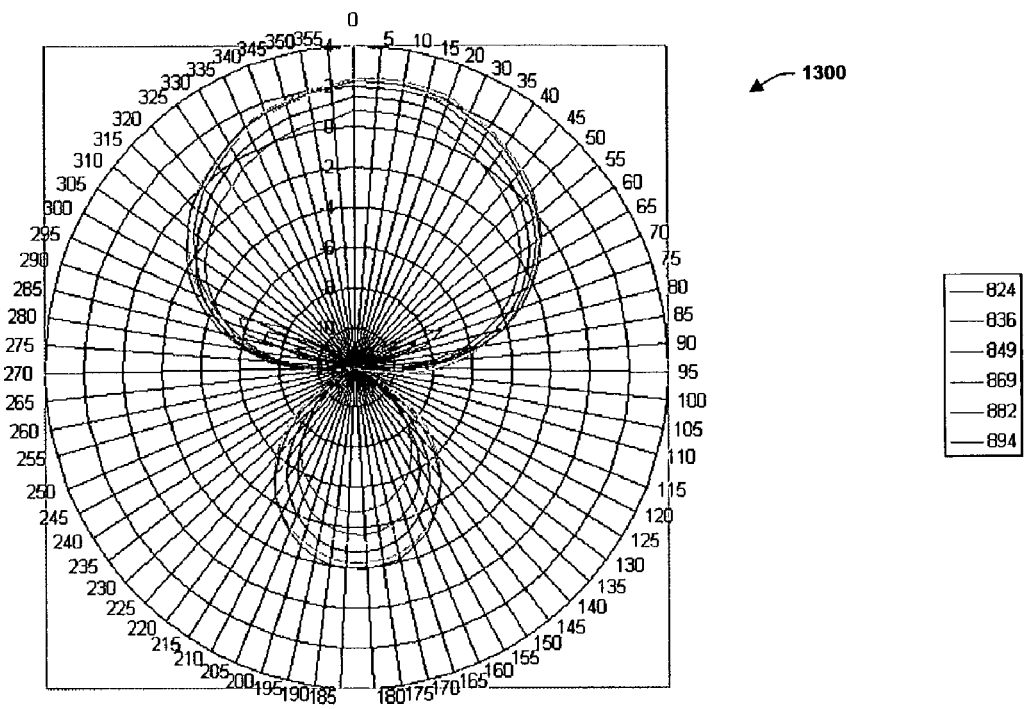
FIG. 13 illustrates an exemplary cellular electromagnetic pattern, in accordance with an aspect of the present invention.
Figure 14:
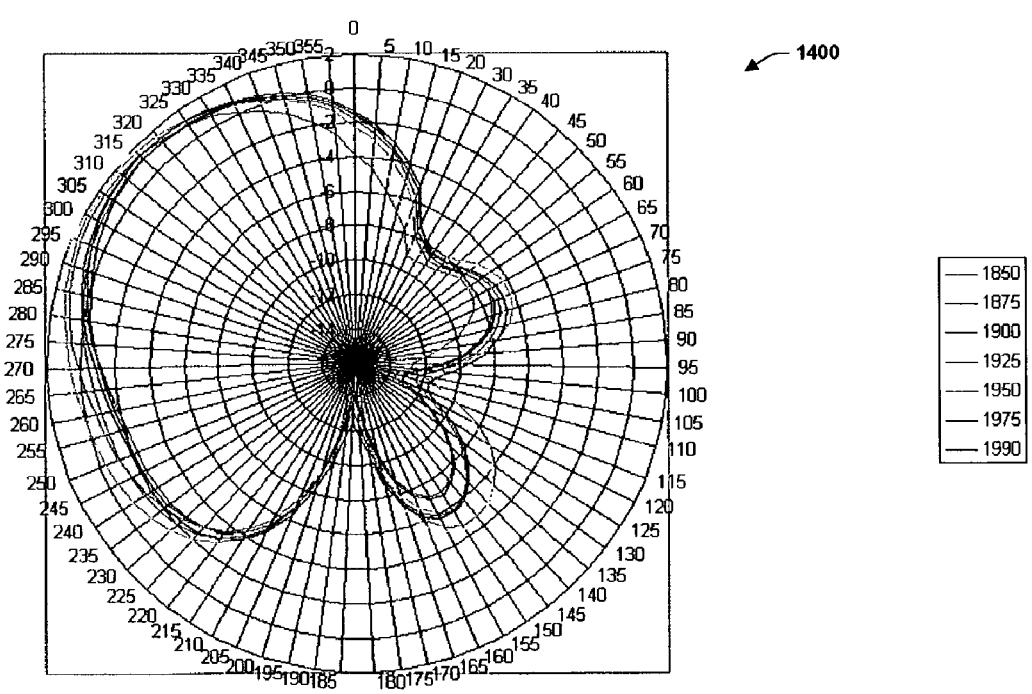
FIG. 14 illustrates an exemplary PCS electromagnetic pattern, in accordance with an aspect of the present invention.

FIGS. 13-14 provide an exemplary electromagnetic patterns 1300 and 1400 illustrating antenna response in the cellular and PCS frequency bands, in accordance with an aspect of the present invention. It is to be appreciated that the graphical representation of the response provides one example over various frequencies and does not limit the invention.

As known, a electromagnetic pattern can indicate a variation of the field intensity, or a spatial distribution of the electromagnetic interference of an antenna in units of dB as an angular function. Typically, information related to directivity, or bandwidth, "front-to-back" (F/B) ratio, and side and rear lobe levels can be extracted from a electromagnetic pattern. Furthermore, the electromagnetic pattern can be represented in polar and/or Cartesian coordinates. For example. Cartesian coordinates can be utilized to represent the intensity with respect to either the plane of the axis of the antenna or the plane perpendicular to the axis, and can be referred to as the azimuth or "E plane" and the elevation or "H-plane" respectively. In addition, various types of plotting scales can be employed. For example, typical scales include linear, linear logarithmic and modified logarithmic scales. Linear scales generally emphasize the main electromagnetic beam, linear logarithmic scales additionally provide an enhanced representation of any sidelobes, and modified logarithmic scales generally emphasize the shape of the major beam while compressing very low-level sidelobes towards the center of the pattern.

Proceeding to FIG. 13, the electromagnetic pattern 1300 depicts a vertical axis with a dBi range from −10 dB to 4 dB, in increments of 2 dB per reference tick and a 360 degree polar axis, in increments of 5 degrees per reference tick. The electromagnetic pattern 1300 further depicts graphical representations corresponding to frequencies of 824 MHz, 836 MHz, 849 MHz, 869 MHz, 882 MHz and 894 MHz. As illustrated, the approximate maximum (e.g., peak) gain in the exemplary electromagnetic pattern 1300 is about 2.5 dBi. Next at FIG. 14, the electromagnetic pattern 1400 depicts a vertical axis with a dBi range from −10 dB to 4 dB (increments of 2 dB), a 360 degree polar axis (increments of 5 degrees), and a graphical representations corresponding to frequencies of 1850 MHz, 1875 MHz, 1900 MHz, 1925 MHz, 1950 MHz, 1975 MHz and 1990 MHz. As illustrated, the approximate maximum (e.g., peak) gain in the exemplary electromagnetic pattern 1400 is about 1-2 dBi.

Figure 15:
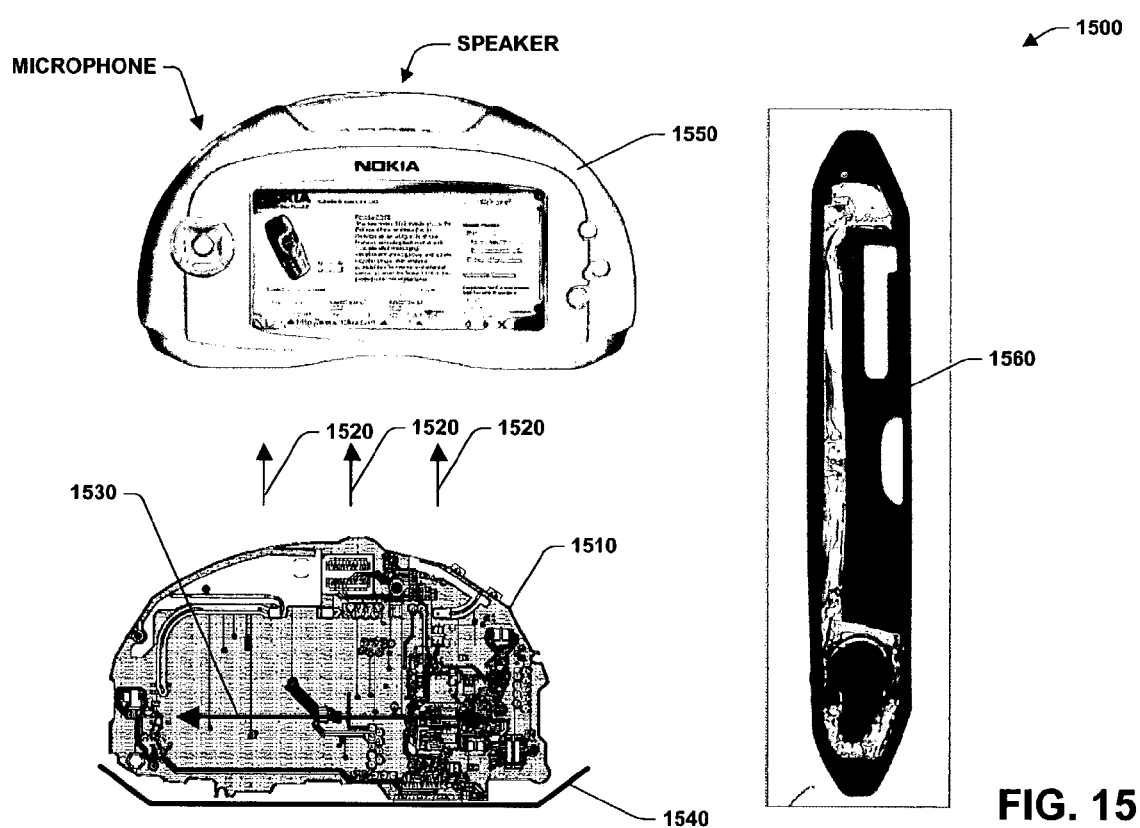
FIG. 15 illustrates an exemplary mobile communication device, in accordance with an aspect of the present invention.

FIG. 15 illustrates an exemplary mobile communication device ("device") 1500 in accordance with an aspect of the present invention. The device 1500 comprises a PWB 1510 with an antenna current 1520 and a PWB current 1530, a reflector 1540, a mobile communication housing ("housing") 1550 and a cover 1560.

The PWB 1510 can be substantially similar to the PWB 110 described herein. For example, the PWB 1510 can comprise a CDMA dual frequency antenna (e.g., the CDMA antenna 120) for transmitting and receiving in the cellular and PCS frequency bands, a GPS antenna (e.g., GPS antenna 400) for receiving in the GPS frequency band, a Bluetooth antenna (e.g., GPS antenna 1110) for transmitting and receiving information with other devices employing Bluetooth technology and a firewall (e.g., firewall 810) to reduce interference indicative of antenna reflections.

The electromagnetic energy 1520 (e.g., indicative of energy flow of one or more antennas associated with the device 1500) generally radiates in a direction away from the PWB 1510 in order to transmit information. The PWB current 1530 generally flows within the electrical elements residing on and associated with the PWB 1510. The reflector 1540 is typically located such that it does not interfere with antennas transmission and reception, and it facilitates shielding and/or reflecting electromagnetic transmission in a direction(s) associated with a user. In addition, the reflector 1540 can be tuned to be inductive in order to achieve increased performance, for example like the Yagi-Udi antenna. Furthermore, it is to be appreciated that the reflector 1540 can be employed with various other antennas (including multi band antennas) and configurations, and is not limited herein.

The housing 1550 provides a shell for the PWB 1510, the reflector 1540 and other associated components, as described below. In addition, the housing 1550 provides for a side phone as well as a conventional configuration. In the conventional configuration, the microphone and/or speaker reside within the side of the phone with the buttons and display that is generally positioned proximate the user's head during deployment. In the side phone configuration, the speaker and microphone reside on the edge of the phone such that the phone can be rotated to position the microphone and speaker proximate to the user's head and the display and buttons away from the user's head. However, it is to be appreciated that the side phone configuration can be employed similar to a conventional configuration, wherein the phone buttons and display are proximate to the user's head along with the microphone and speaker.

Employing the side phone configuration, for example in connection with the housing 1550, positions the antenna further away from the user, which can mitigate lost antenna energy, increase antenna efficiency and performance, and improve the harmony between the antenna and the phone. In addition, the side phone configuration provides for a metal strip to be employed between the antenna and user, which can facilitate electromagnetic reflection away from the user and increase efficiency and peak gain.

The cover 1560 (e.g., a metallized C-cover) is typically coupled to the housing 1550 and located proximate the reflector 1540. The cover 1560 can provide additional shielding and/or reflecting, and can be combined with the reflector 1540 to construct an individual component. When the reflector 1540 is suitably tuned, the device 1500 can provide for mobile communication improvements such as increased peak gain, and increased front-to-back ratio, increased bandwidth (BW)

Figure 16:
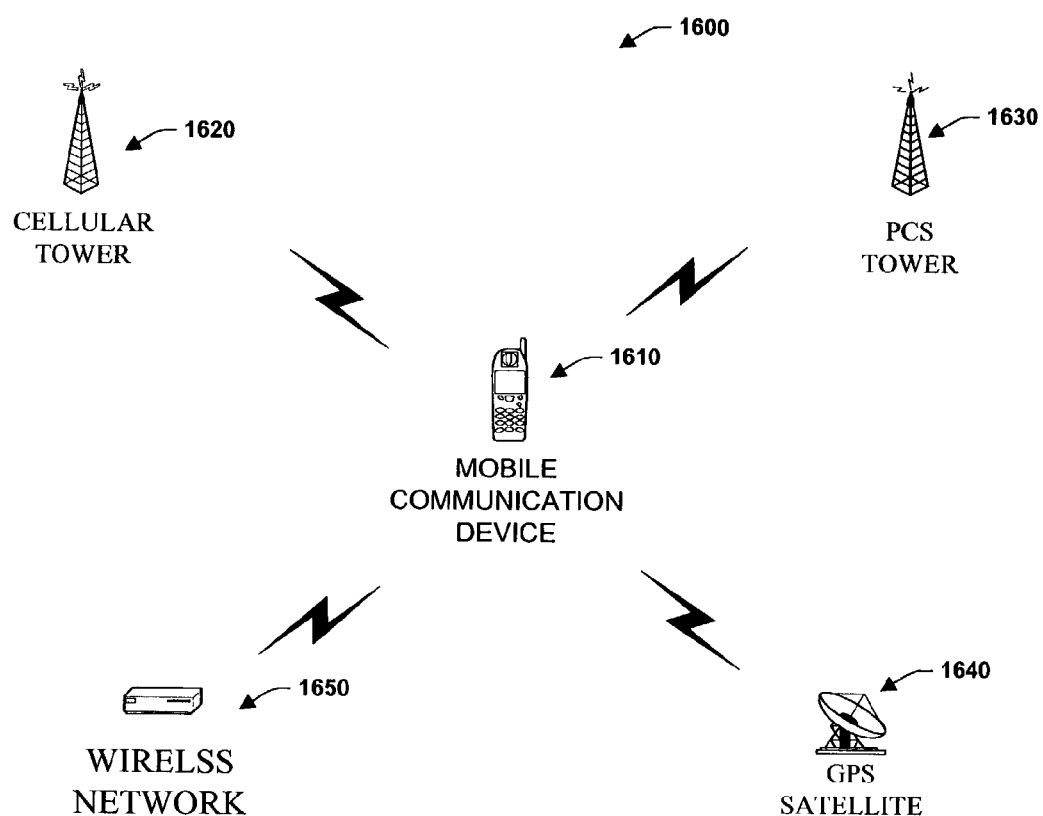
FIG. 16 illustrates an exemplary mobile communication and associated environment, in accordance with an aspect of the present invention.

Proceeding to FIG. 16, an exemplary mobile communications environment ("environment") 1600 is illustrated in accordance with an aspect of the present invention. The environment 1600 comprises a mobile communication device ("device") 1610, a cellular transceiver 1620, a PCS transceiver 1630, a GPS transceiver 1640 and a wireless network 1650.

The device 1610 can be similar to the systems and components described herein and/or can include the aforementioned systems and components. For example, the device 1610 can comprise a dual frequency (also known as multi frequency or band) CDMA antenna, a GPS antenna, a Bluetooth antenna, and other components such as a firewall, a processing component and a reflector. In addition, enhanced and other transmission technologies (e.g., CDMA2000, WCDMA and TD-SCDMA) and other various other antenna configurations, as described supra, can be utilized in accordance with an aspect of the invention.

The device 1610 can employ its various mobile communication technologies to communicate with the cellular transceiver 1620, the PCS transceiver 1630, the GPS receiver 1640 and the wireless network 1650. For example, the device 1610 can transmit cellular information to and/or receiver cellular information from the cellular transceiver 1620. Likewise, the device can transmit and/or receive information with the wireless network 1650, for example with one or more devices employing Bluetooth technology or Wi-Fi/WLAN such as a PDA, a printer, a copier, a facsimile, a scanner, a display, a computer, a microprocessor and/or another mobile communication device similar to the device 1610.

Figure 17:
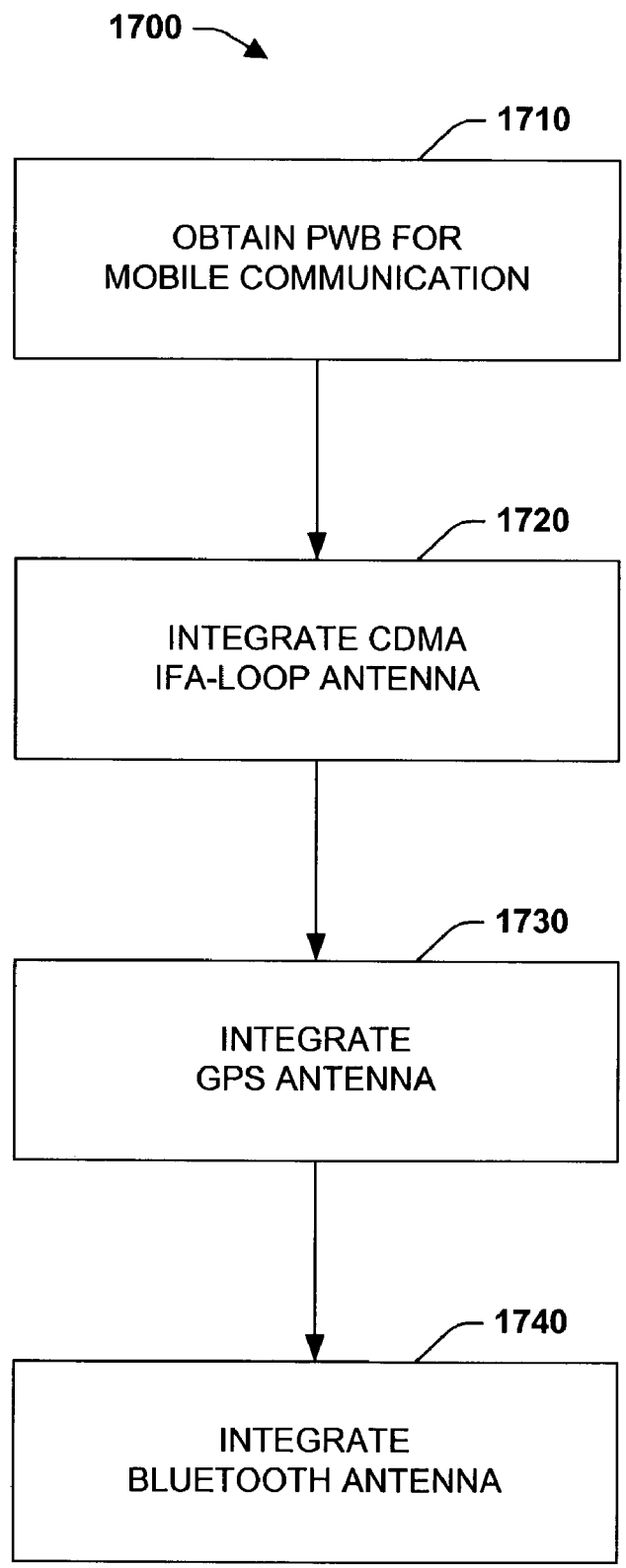
FIG. 17 illustrates a method to generate a cellular/PCS/GPS/Bluetooth mobile communication device that employs a dual frequency IFA/loop CDMA antenna, in accordance with an aspect of the present invention.
Figure 18:
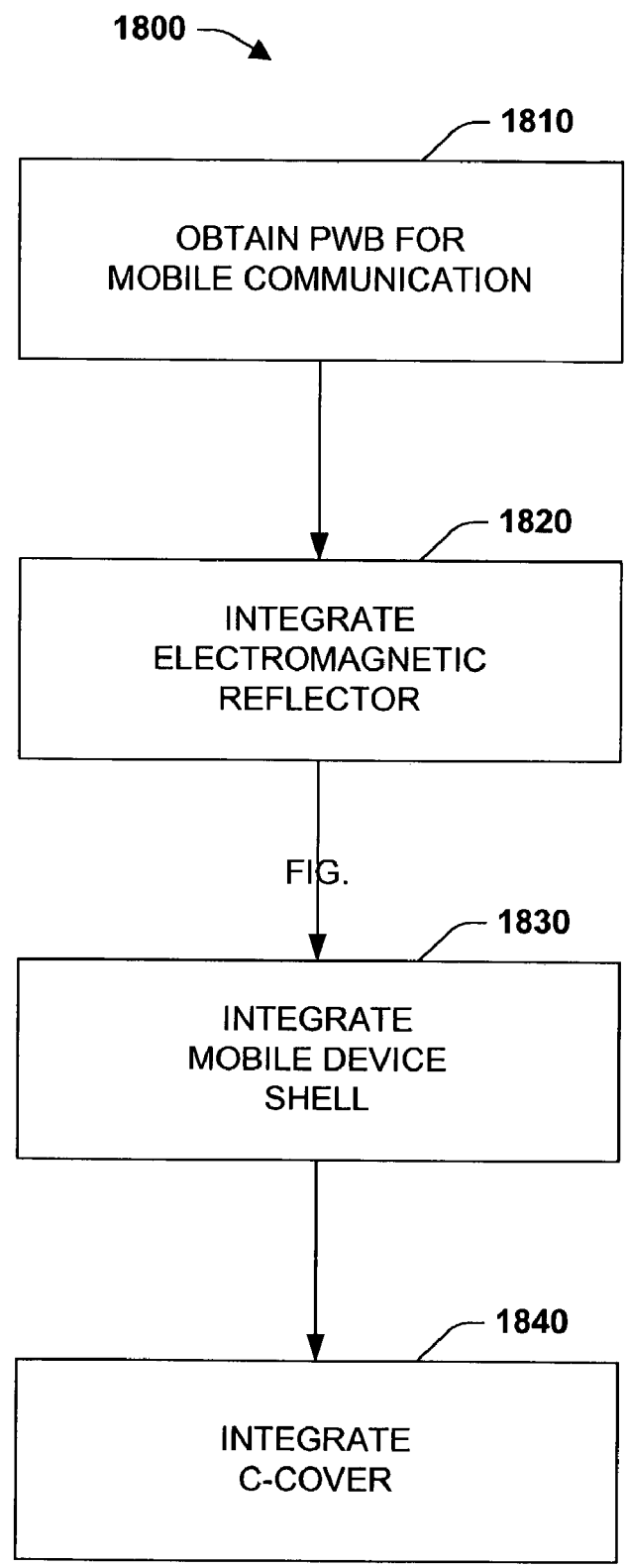
FIG. 18 illustrates a method to generate a multi-band mobile communication device that employs a dual frequency IFA/loop CDMA antenna, in accordance with an aspect of the present invention.

FIGS. 17-18 illustrate block diagrams relating to methodologies in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to FIG. 17, a method 1700 to produce a novel and compact mobile communication device that employs CDMA technology with a dual frequency IFA/loop transceiver, a GPS receiver, and Bluetooth technology, while reducing device size and cost.

At reference numeral 1710, a PWB is procured for a mobile communication device. The PWB typically comprises a non-conducting substrate with conductive patterns (e.g., traces, pads and grounds). The conductive patterns are typically copper, however other elements such as nickel, silver, tin, tin-lead, gold and the like can be concurrently utilized, for example as etch-resists or top-level metal. In addition, the PWB can be single sided, double sided or multilayered. Furthermore, the PWB can be manufactured to be rigid and/or flexible, depending on the utilization of the board.

At reference numeral 1720, a fully integrated CDMA antenna is employed in the mobile communication device design. A fully integrated antenna can achieve response characteristics similar to a non-fully integrated antenna and, in addition, provide for a more compact design via antenna size reduction. Thus, employing the fully integrated CDMA antenna affords for device compaction as well. In addition, fully integrating the CDMA antenna provides for additional electromagnetic shielding via the PWB, which can reduce the amount of user electromagnetic interference.

In one aspect of the invention, the CDMA antenna comprises an IFA antenna and a loop antenna. The IFA antenna can be configured to transmit and receive information within the cellular frequency band. Configuration comprises employing a capacitive tap and air gap proximate to the IFA antenna to establish a capacitance such that the IFA antenna will resonate within the cellular frequency band, thus maximizing power transfer for cellular signals while substantially reducing power transfer for signals not within the cellular band. Additionally, the capacitive tap can improve cell band peak gain and can reduce antenna interference from a user's hand. The loop antenna is configured to transmit and receive information within the PCS frequency band. Configuration comprises employing an impedance matching stub and adjusting the ground location to determine the loop size.

In another aspect of the present invention, employing the fully integrated CDMA antenna can provide for improvements over conventional techniques, including cost reduction. For example, conventional systems and methods typically employ lumped elements to achieve dual band matching. Lumped elements can increase cost and size via additional components and can degrade performance. Employing the fully integrated IFA/loop CDMA dual frequency antenna mitigates employing lumped elements to form a dual frequency antenna, and thus can reduce cost and improve reliability and efficiency via eliminating lumped element circuitry. Furthermore, the location of the CDMA antenna on the PWB can be designed to position the CDMA antenna to minimize user hand interference, the "hand affect."

At reference numeral 1730, a GPS antenna assembly and an associated firewall are employed in the mobile communication device. The GPS antenna assembly generally comprises at least a radiator, a carrier, a Gamma match, a spring contact point and a spring contact. The radiator can be formed of metal (e.g., sheet metal) and embedded within the carrier (e.g., plastic). The radiator can be employed to transmit and receive signals within the GPS frequency band. The carrier generally facilitates housing the radiator and mounting the GPS antenna to the PWB.

The GPS gamma match can be employed for GPS antenna impedance matching and to facilitate coupling the GPS antenna to the PWB. The GPS Gamma match provides a single connection point via the spring contact point for the spring contact, which provides for a single connection and facilitates formation of the IFA antenna. Conventionally, a two-connection point technique is employed. Thus, the present invention can improve reliability by reducing the number of connection points to a single connection point.

The firewall can be employed to mitigate coupling between the PCS antenna and the GPS antenna. In general, PCS signal power can couple (e.g., inductively) to the GPS antenna, wherein the power can be re-radiated by the GPS antenna, which can diminish performance. Providing the firewall mitigates the parasitic radiating behavior of the GPS antenna in the PCS band, which increases peak gain, improves performance, and enhances efficiency. For example, the firewall can increases PCS antenna performance.

At reference numeral 1740, a Bluetooth antenna is employed in the mobile communication device. The Bluetooth antenna provides for communication with other devices that concurrently employ Bluetooth technology. For example, for communication with devices such as mobile phones, computers, wireless headsets, PDA's, printers, copiers, facsimiles, scanners and automobiles audio systems.

Proceeding to FIG. 18, a method 1800 to produce a novel and compact multi-band mobile communication device that employs a dual frequency IFA/loop CDMA antenna, a GPS antenna, a Bluetooth antenna, and to reduce device size, cost, and antenna interference is illustrated.

At reference numeral 1810, a PWB comprising a dual frequency IFA/loop CDMA antenna, a GPS antenna, a Bluetooth antenna, and a firewall, as described herein, is obtained. The architecture of the foregoing is designed to reduce device size and cost, and antenna interference. For example, a fully integrated IFA/loop CDMA antenna can be employed which provides for antenna size reduction, elimination of lumped elements, which reduces footprint and cost, and provides additional electromagnetic shielding. In another example, the GPS antenna provides for a single spring contact point that reduces the number of contact points to facilitate IFA antenna construction. In yet another example, the firewall can mitigate parasitic coupling between the loop and GPS antennas, and enable close placement of antennas.

At reference numeral 1820, a reflector is coupled to the PWB. The reflector is typically located such that it can be employed to facilitate shielding and/or reflecting electromagnetic interference from a user. Additionally, the reflector can provide for improvements such as increased peak gain, efficiency, front-to-back ratio, and bandwidth.

At reference numeral 1830, a mobile communication shell can be employed in connection with the PWB and reflector described above, as well as other components such as an audio speaker, a power supply, and input/output (I/O), for example. The shell can provide a housing for components. The shell can include features such as an ergonomic design, a display (e.g., CRT, LCD, LED and/or flat panel), multi-purpose data entry and navigation buttons, on-screen touch sensitive regions, various ports (e.g., universal serial bus (USB), firewire, Ethernet, a headphone set, a microphone, a battery charger, and a printer).

At reference numeral 1840, a cover can be employed in connection with the mobile communication shell. The cover, typically a metallized C-cover, can be employed in connection with the shell to facilitate housing components. Additionally, the cover can provide for quick access to the housed components, for example by a technician. Furthermore, the cover can provide additional electromagnetic shielding.

Figure 19:
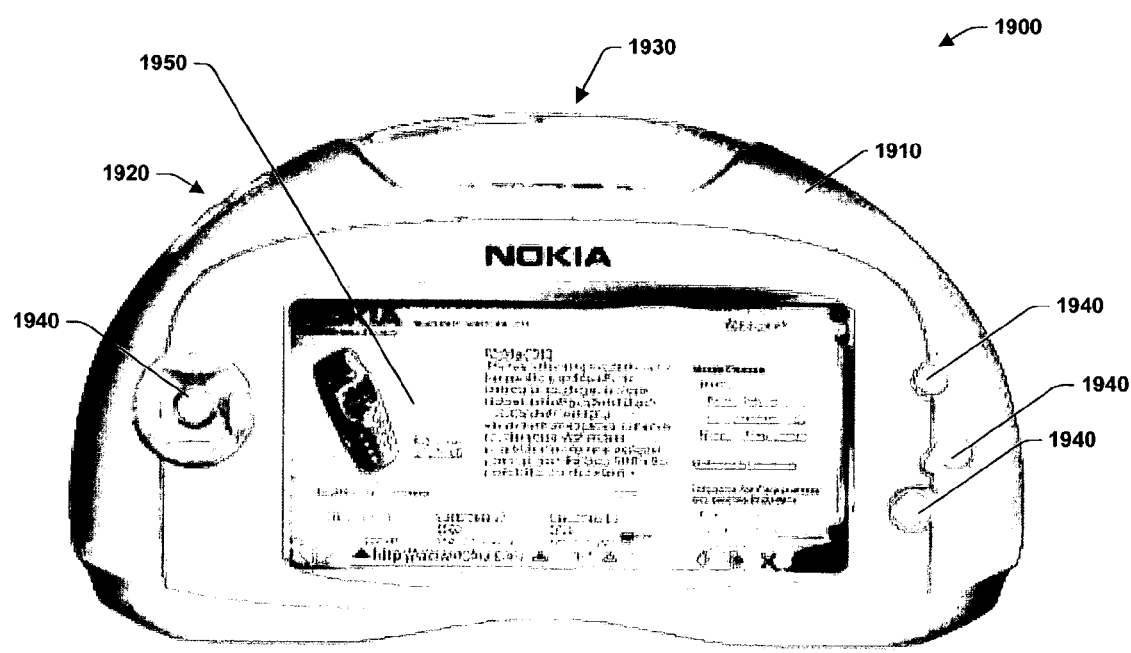
FIG. 19 illustrates a portable wireless telephone, in accordance with an aspect of the present invention.

Referring to FIG. 19, a portable wireless telephone 1910 incorporating the novel aspects of the present invention described supra is illustrated. The telephone can include an integrated dual frequency CDMA (e.g., employing an IFA antenna and a loop antenna), a GPS, and a Bluetooth antenna for transmitting and receiving information in the cellular, PCS and GPS frequency bands, and for communicating with other devices employing Bluetooth and Wi-Fi/WLAN technologies, as described herein. The portable wireless telephone 1910 can further include a microphone 1920 that receives audio signals and conveys the signals to at least one on-board processor for audio signal processing, and an audio speaker 1930 for outputting audio signals to a user, including processed voice signals of a caller and recipient music, alarms, and notification tones or beeps. Additionally, the portable wireless telephone 1910 can include a power source such as a rechargeable battery (e.g., Alkaline, NiCAD, NiMH and Li-ion), which can provide power to substantially all onboard systems when the user is mobile.

The telephone 1910 can further include a plurality of multi-function buttons 1940 and on-screen touch sensitive locations (not shown) to allow a user to provide information for dialing numbers, selecting options, navigating the Internet, enabling/disabling power, and navigating a software menuing system including features in accordance with telephones configurations. A display 1950 can be provided for displaying information to the user such as a dialed telephone number, caller telephone number (e.g., caller ID), notification information, web pages, electronic mail, and files such as documents, spreadsheets and video. The display 1950 can be a color or monochrome display (e.g., CRT, LCD, LED and/or flat panel), and employed concurrently with audio information such as beeps, notifications and voice.

The telephone 1910 can further include memory for storing information. The memory can include non-volatile memory and volatile memory, and can be permanent and/or removable. The telephone 1910 can further include a high-speed data interface such as USB (Universal Serial Bus) and IEEE1394 for communicating data with a computer. Such interfaces can be used for uploading and downloading information, for example website information and content, caller history information, address book and telephone numbers, and music residing in the second memory. In addition, the telephone 1910 can communicate with various input/output (I/O) devices such as a keyboard, a keypad, and a mouse.

FIGS. 20-35 illustrate other PWB dual band antenna configurations along with associated prototype photographs, return loss plots and electromagnetic patterns, in accordance with the present invention. It is to be appreciated that the following exemplary antenna configurations are provided for illustrative purposes and do not limit the invention.

Figure 20:
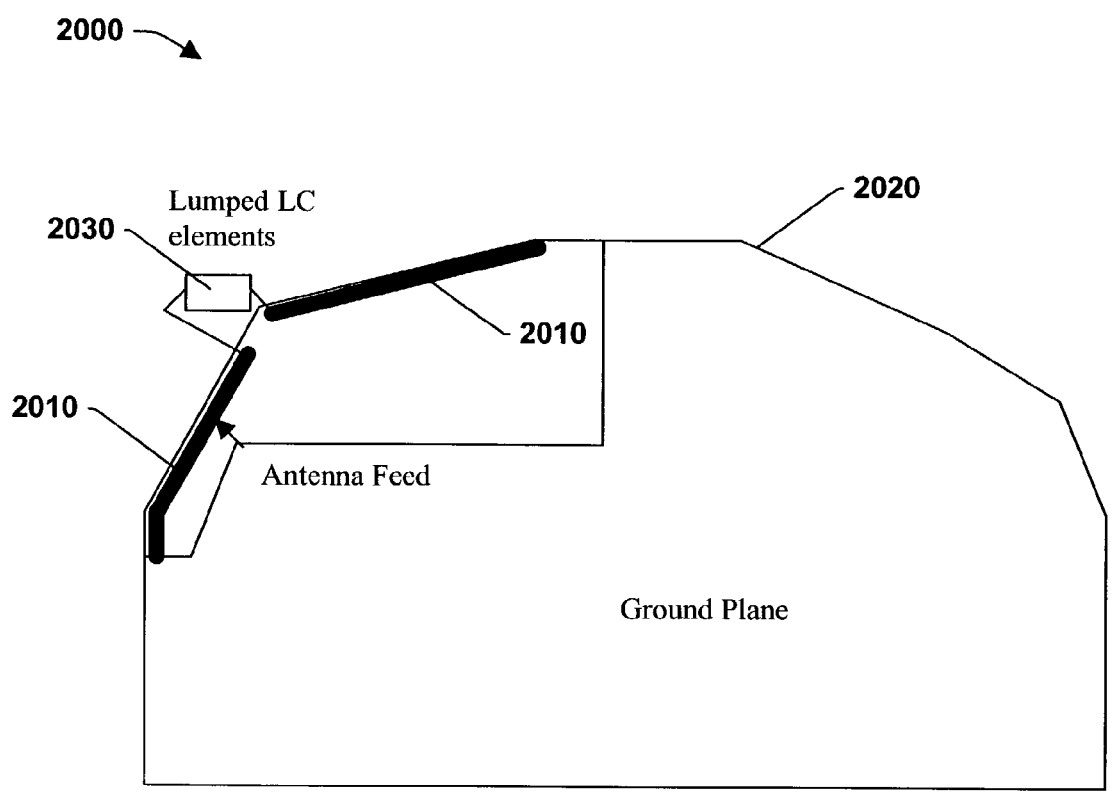
FIG. 20 illustrates a first exemplary IFA dual band antenna configuration, in accordance with an aspect of the present invention.

Proceeding to FIG. 20, a first antenna configuration 2000 is illustrated. The first antenna configuration 2000 comprises a dual band IFA PWB comprising one or more traces 2010, a PWB 2020 and parasitic elements 2030. The traces 2010 are typically conductive patterns on the PWB 2020. As noted supra, the conductive patterns are typically formed of copper, and can be formed across multiple layers, wherein the layers can be connected with vias to reduce ohmic losses. The traces 2010 can be positioned along the edge of the PWB 2020 (as depicted) in order to provide improved cell band directivity and increased front-to-back ratio, which renders high effective radiated power (ERP). In addition, at least one of the traces 2010 can be employed as a feed for the antenna.

Figure 21:
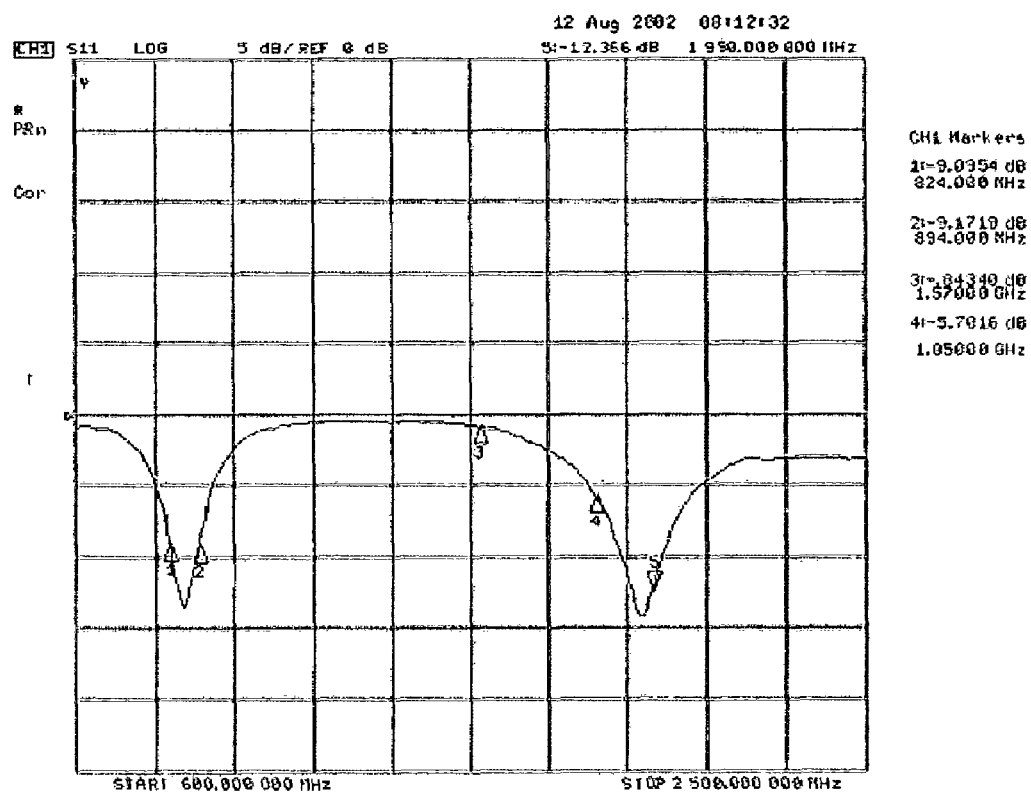
FIG. 21 illustrates an exemplary return loss graph for the first IFA dual band antenna configuration, in accordance with an aspect of the present invention.
Figure 22:
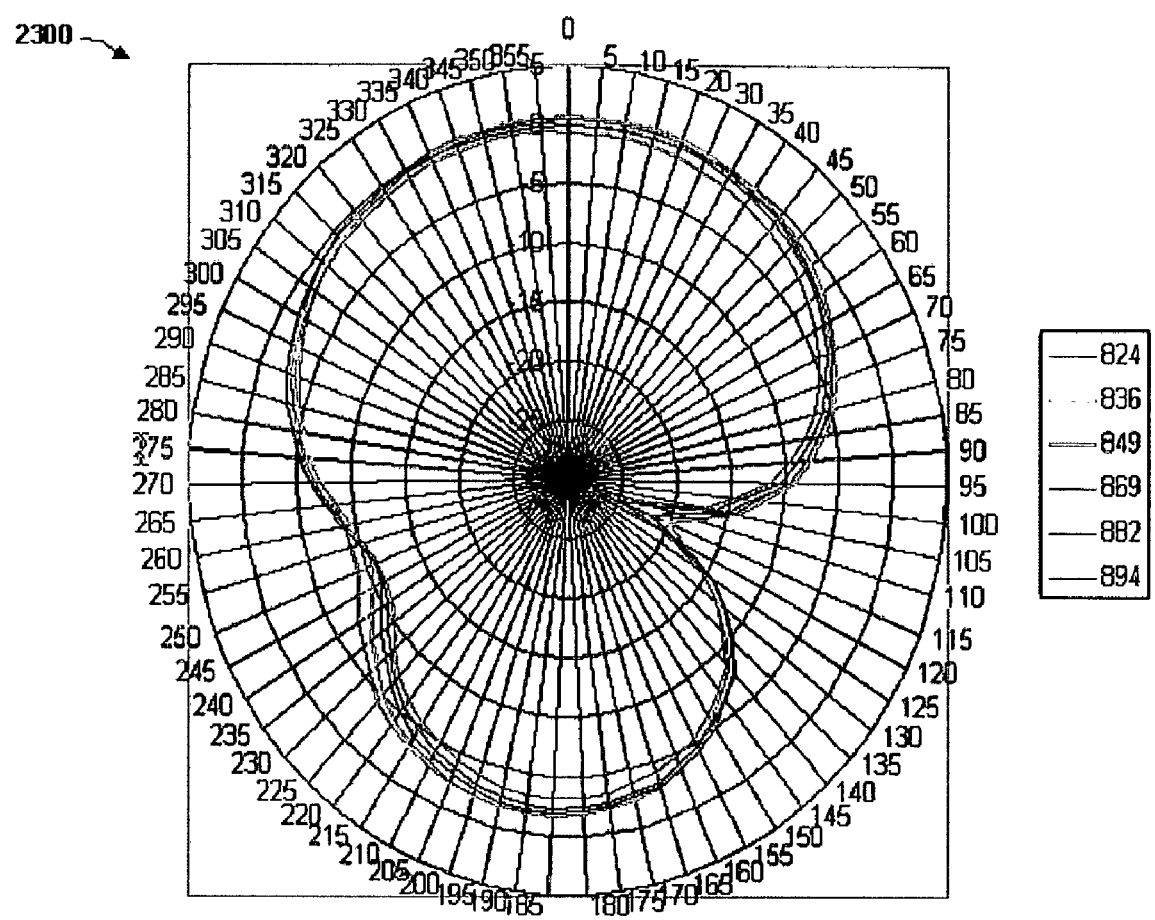
FIG. 22 illustrates an exemplary cellular electromagnetic pattern for the first IFA dual band antenna configuration, in accordance with an aspect of the present invention.

The parasitic elements 2030 typically comprise inductive (L) and capacitive (C) components to form a lumped LC tank circuit, wherein the resonant frequency of the tank is determined by the inductive and capacitive component values. The position of the parasitic elements 2030 and the resonant frequency facilitate controlling the PCS band directivity. FIG. 21 illustrates a photographic depiction of a prototype of the first antenna configuration 2000.

Next at FIG. 21, a return loss graph 2200 for the first antenna configuration 2000 is illustrated. At 2210, a frequency of 824 MHz corresponds to a return loss of −9.0954 dB. At 2220, 894 MHz corresponds to a return loss of −9.1719 dB. At 2230, 1570 MHz corresponds to a return loss of −0.84340 dB. At 2240, 1850 MHz corresponds to a return loss of −5.7016 dB. At 2250, 1990 MHz corresponds to a return loss of about −12.366 dB.

Figure 23:
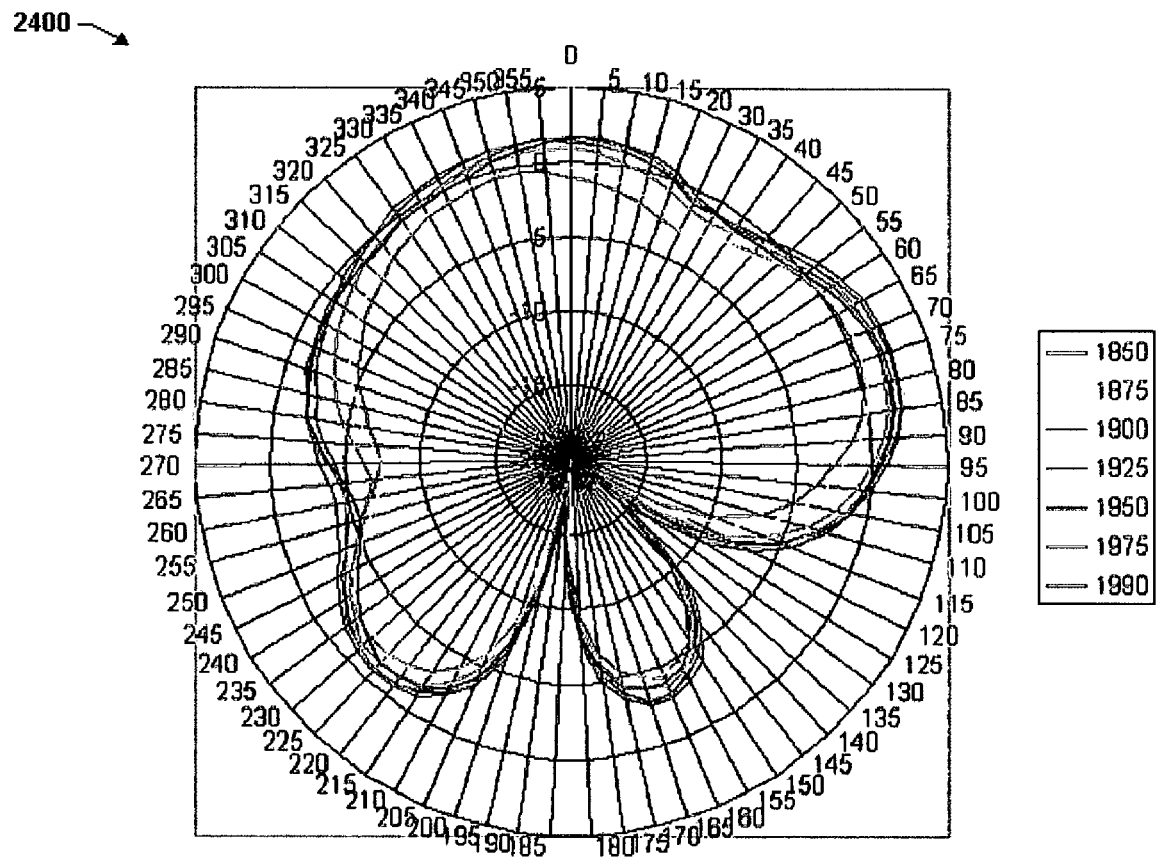
FIG. 23 illustrates an exemplary PCS electromagnetic pattern for the first IFA dual band antenna configuration, in accordance with an aspect of the present invention.
Figure 24:
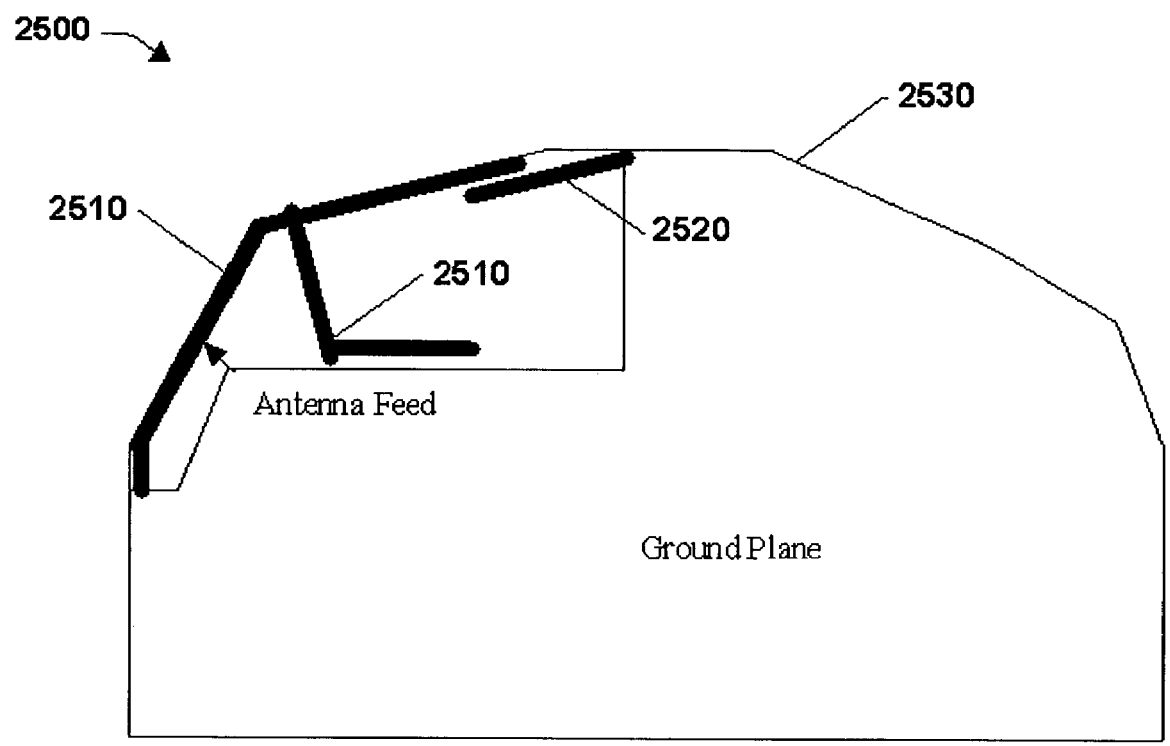
FIG. 24 illustrates a second exemplary IFA dual band antenna configuration, in accordance with an aspect of the present invention.

FIGS. 23 and 24 illustrate cellular and PCS electromagnetic patterns for the first antenna configuration 2000. Proceeding to FIG. 22, the electromagnetic pattern 2300 for the cellular band (e.g., 824 MHz, 836 MHz, 849 MHz, 869 MHz, 882 MHz and 894 MHz) is depicted. As illustrated, an approximate maximum gain for the exemplary electromagnetic pattern 2300 is about 1 dBi. Next at FIG. 23, the electromagnetic pattern 2400 for the PCS band (e.g., 1850 MHz, 1875 MHz, 1900 MHz, 1925 MHz, 1950 MHz, 1975 MHz and 1990 MHz) is depicted. The approximate maximum gain for the exemplary electromagnetic pattern 2400 is about 2 dBi.

Moving to FIG. 24, a second antenna configuration 2500 is illustrated. The second antenna configuration 2500 comprises a dual band PWB antenna comprising one or more traces 2510, a parasitic trace 2520, and a PWB 2530. The one or more traces 2510 and the parasitic trace 2520 are typically positioned near the edge of the PWB 2530. In addition, at least one of the traces 2510 can be employed as a feed for the antenna. The parasitic trace 2520 typically extends towards a capacitive element of the antenna, and facilitates enhancing the antenna gain in the cell band and reduces detuning via a user's hand.

Figure 25:
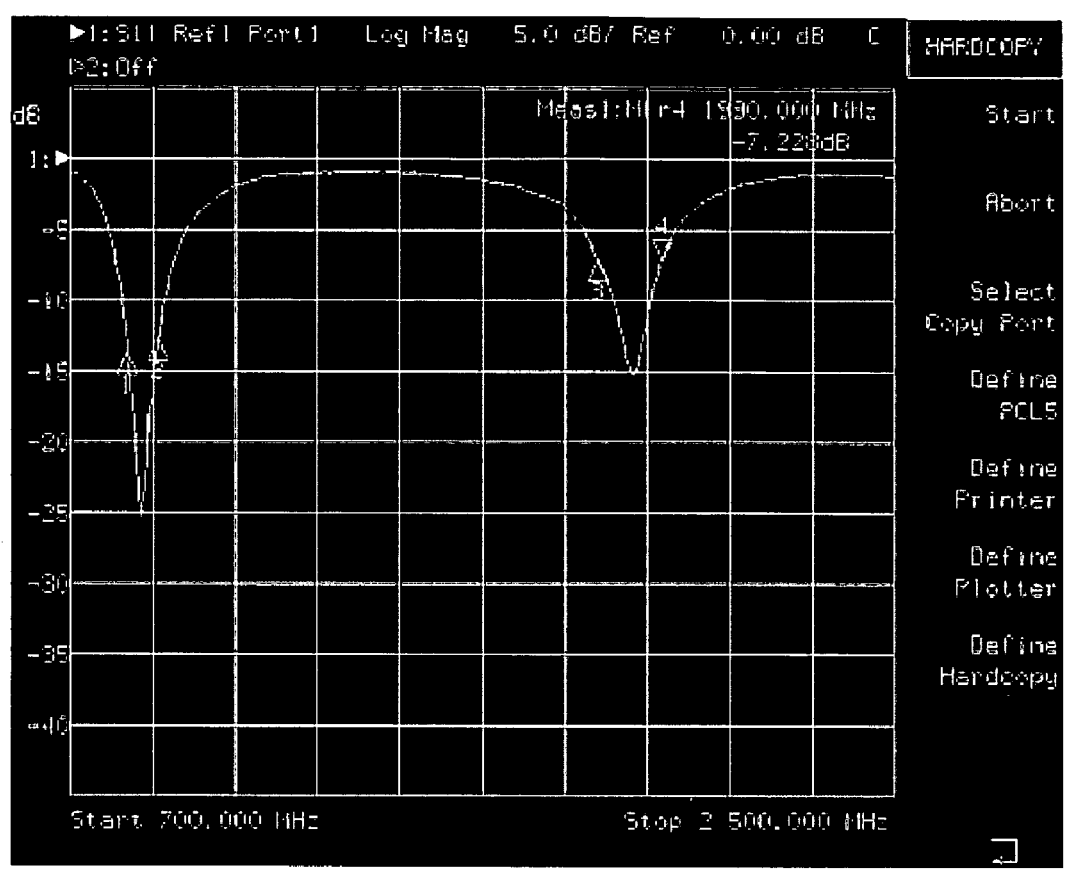
FIG. 25 illustrates an exemplary return loss graph for the second IFA dual band antenna configuration, in accordance with an aspect of the present invention.
Figure 26:
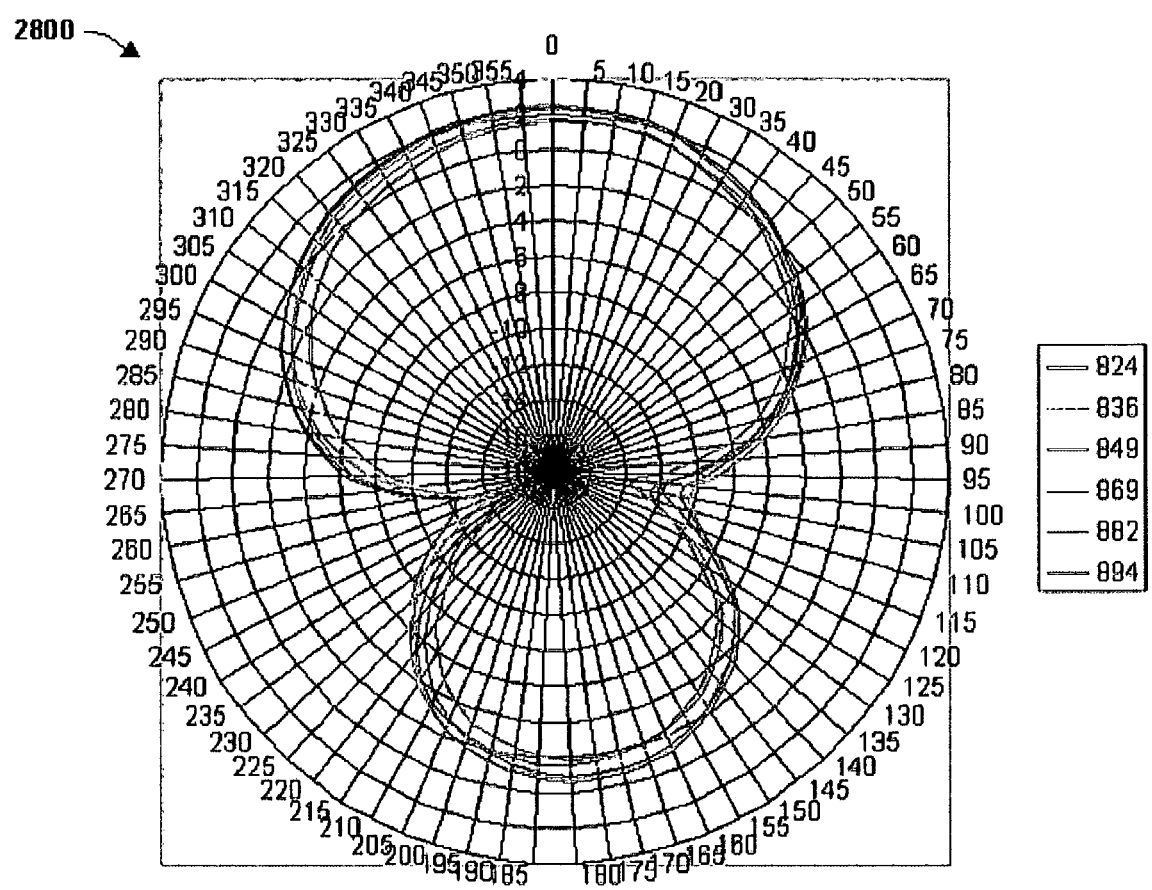
FIG. 26 illustrates an exemplary cellular electromagnetic pattern for the second IFA dual band antenna configuration, in accordance with an aspect of the present invention.
Figure 27:
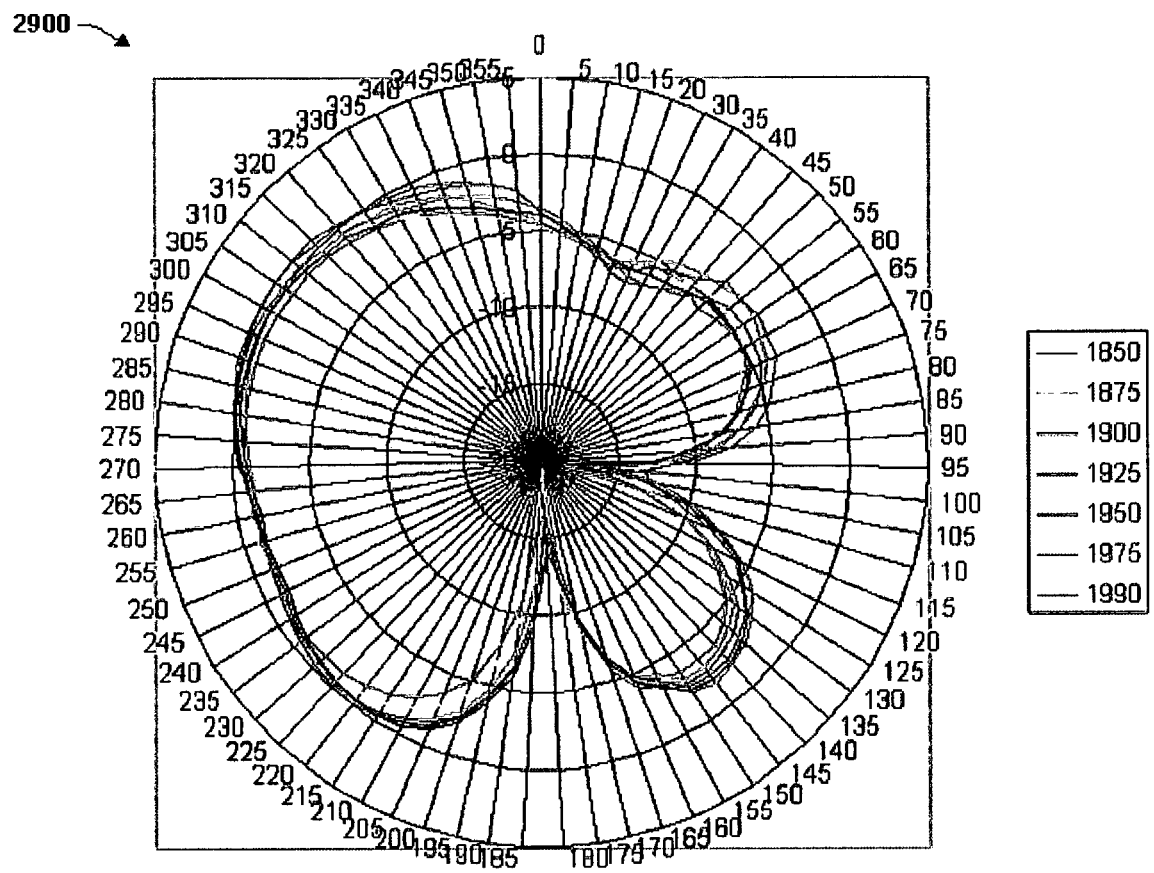
FIG. 27 illustrates an exemplary PCS electromagnetic pattern for the second IFA dual band antenna configuration, in accordance with an aspect of the present invention.

Next at FIG. 25, a return loss graph 2700 associated with the second antenna configuration 2500 is illustrated. FIGS. 26 and 27 illustrate cellular and PCS electromagnetic patterns for the second antenna configuration 2500. Proceeding to FIG. 26, the electromagnetic pattern 2500 for the cellular band is depicted. As illustrated, an approximate maximum gain for the exemplary electromagnetic pattern 2500 is about 2.5 dBi. Next at FIG. 27, the electromagnetic pattern 2900 for the PCS band is depicted. The approximate maximum gain for the exemplary electromagnetic pattern 2900 is about 1 dBi.

Figure 28:
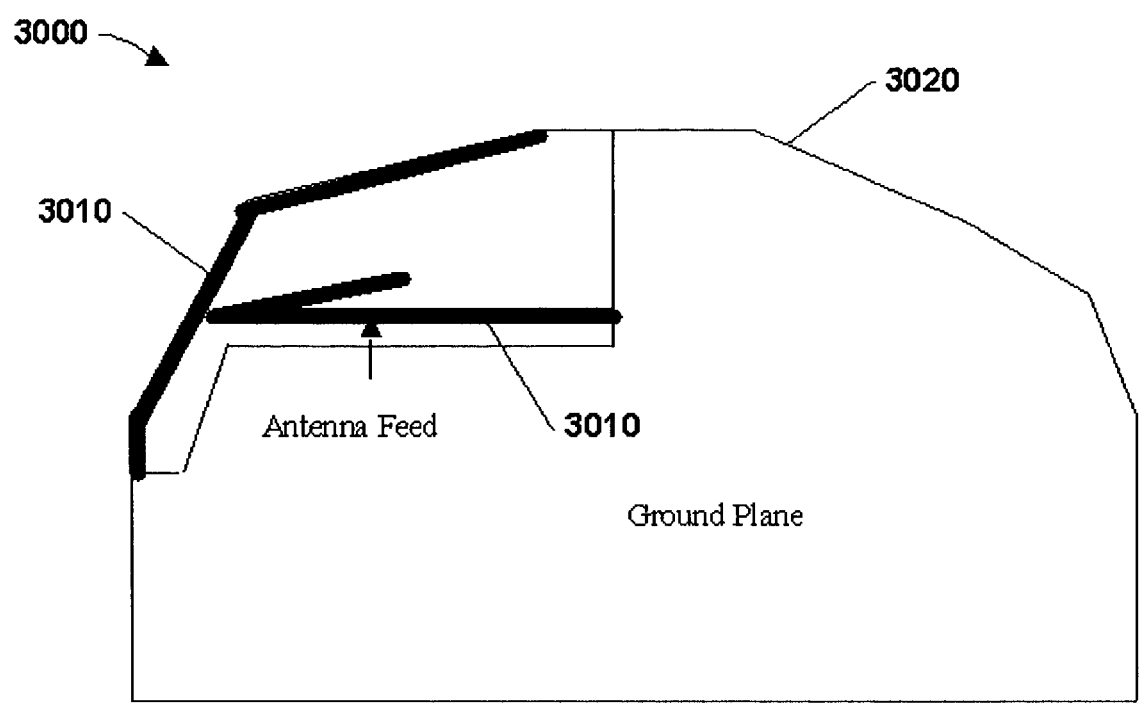
FIG. 28 illustrates a third exemplary IFA dual band antenna configuration, in accordance with an aspect of the present invention.

Proceeding to FIG. 28, a third antenna configuration 3000 is illustrated. The third antenna configuration 3000 comprises a dual band PWB antenna comprising one or more traces 3010 and a PWB 3020. The one or more traces 3010 reside on the PWB 3020, wherein at least one of the traces 3010 can be employed as a feed for the antenna.

Figure 29:
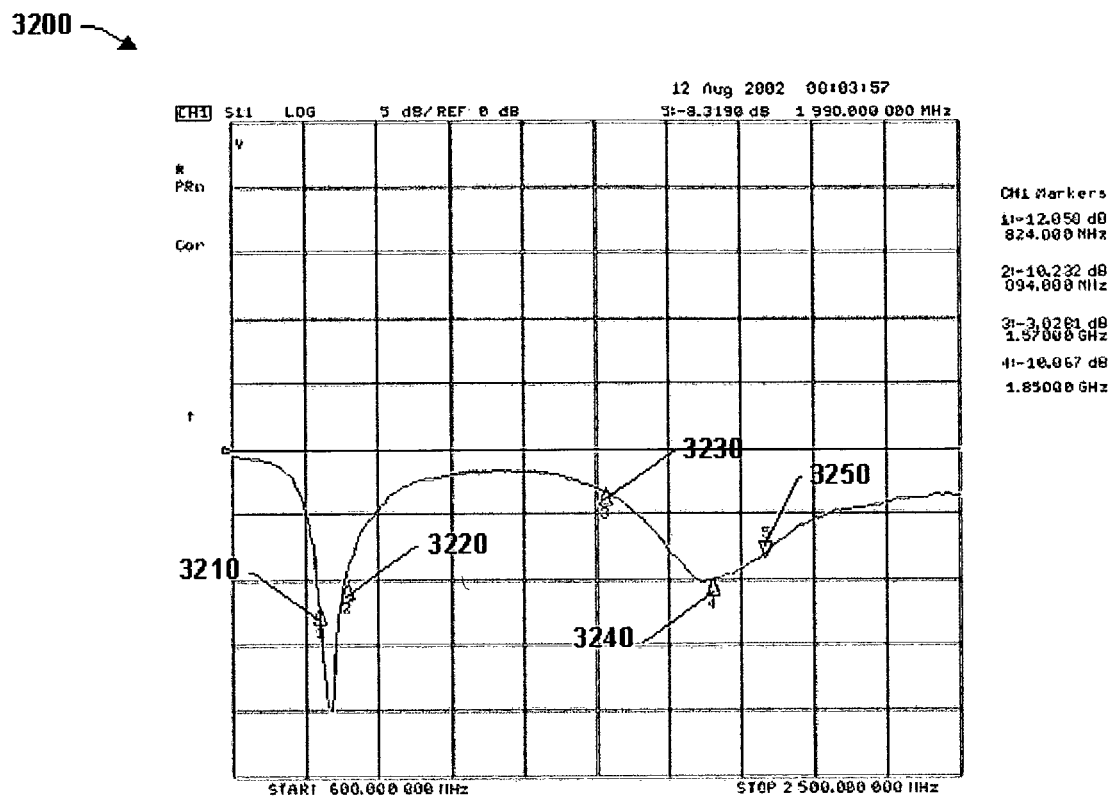
FIG. 29 illustrates an exemplary return loss graph for the third IFA dual band antenna configuration, in accordance with an aspect of the present invention.

FIG. 29 illustrates a return loss graph 3200 for the third antenna configuration 3000. At 3210, 824 MHz corresponds to a return loss of −12.058 dB. At 3220, 894 MHz corresponds to a return loss of −10.232 dB. At 3230, 1570 MHz corresponds to a return loss of −3.0281 dB. At 3240, 1850 MHz corresponds to a return loss of −10.067 dB. At 3250, 1990 MHz corresponds to a return loss of about −8.3190 dB.

Figure 30:
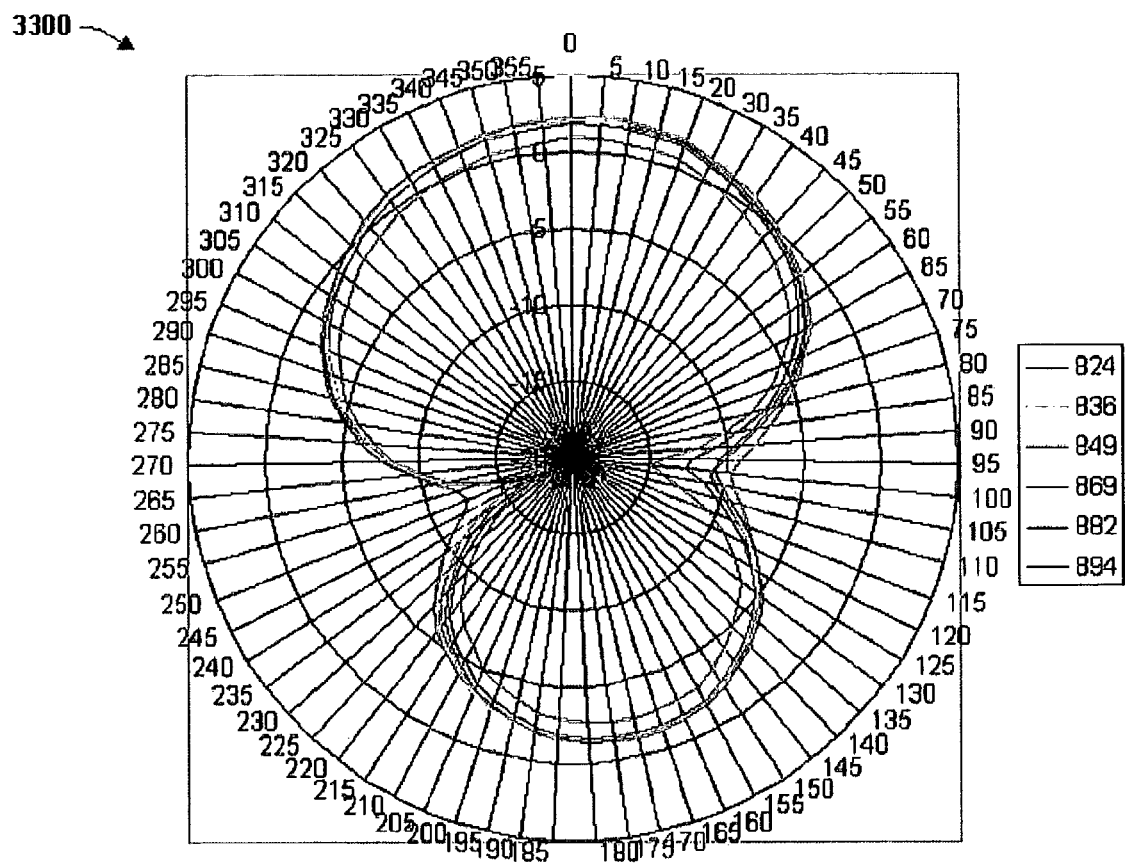
FIG. 30 illustrates an exemplary cellular electromagnetic pattern for the third IFA dual band antenna configuration, in accordance with an aspect of the present invention.
Figure 31:
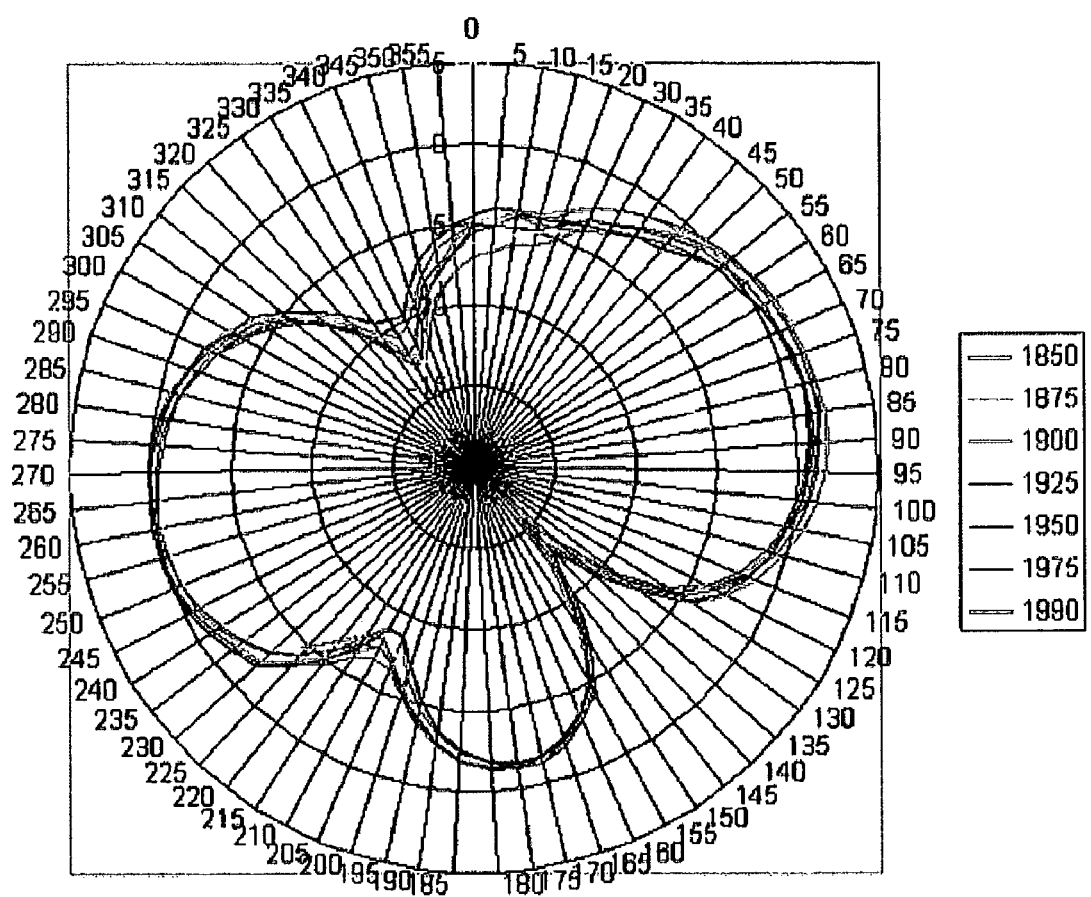
FIG. 31 illustrates an exemplary PCS electromagnetic pattern for the third IFA dual band antenna configuration, in accordance with an aspect of the present invention.

FIGS. 30 and 31 illustrate cellular and PCS electromagnetic patterns for the third antenna configuration 3200. Proceeding to FIG. 30, the electromagnetic pattern 3300 for the cellular band is depicted. As illustrated, an approximate maximum gain for the exemplary electromagnetic pattern 3200 is about 3 dBi. Next at FIG. 31, the electromagnetic pattern 3400 for the PCS band is depicted. The approximate maximum gain for the exemplary electromagnetic pattern 3400 is about 2 dBi.

Figure 32:
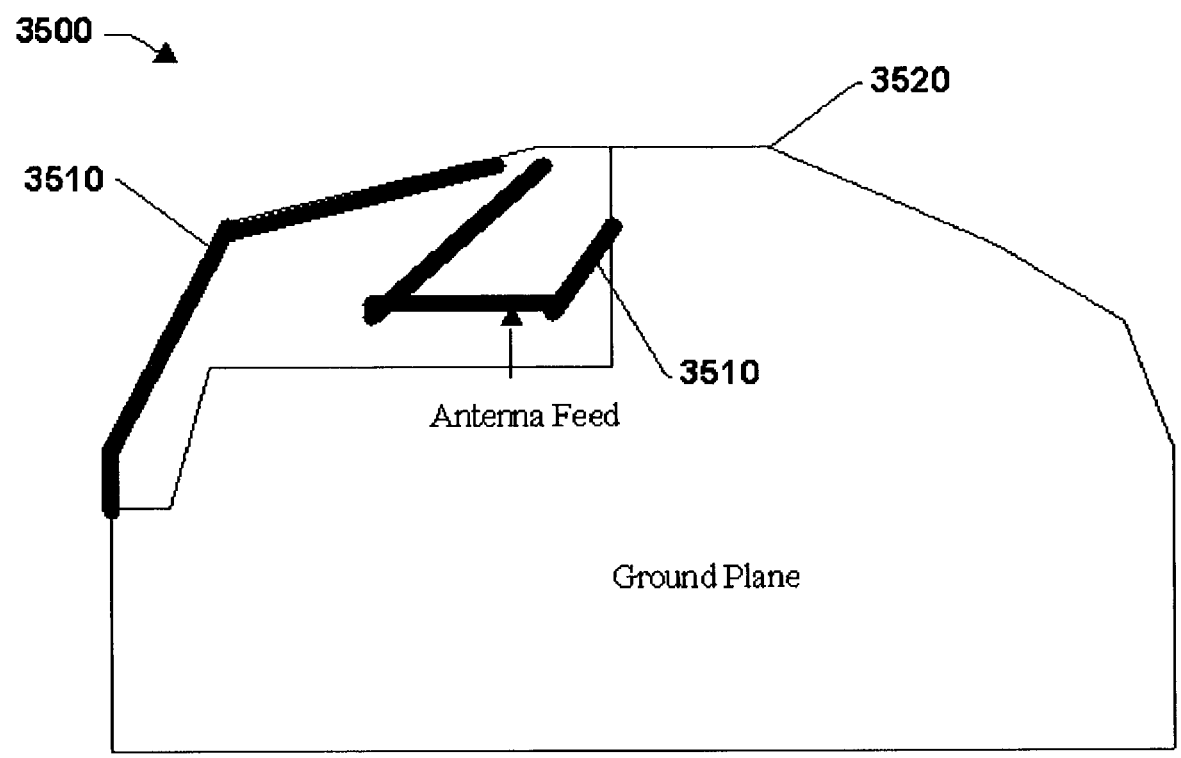
FIG. 32 illustrates a fourth exemplary IFA dual band antenna configuration, in accordance with an aspect of the present invention.

At FIG. 32, a fourth antenna configuration 3500 is illustrated. The fourth antenna configuration 3500 comprises a dual band PWB antenna comprising one or more traces 3510 and a PWB 3520. In general, the one or more traces 3510 reside on the PWB 3520. At least one of the traces 3510 can be employed as a feed for the antenna.

Figure 33:
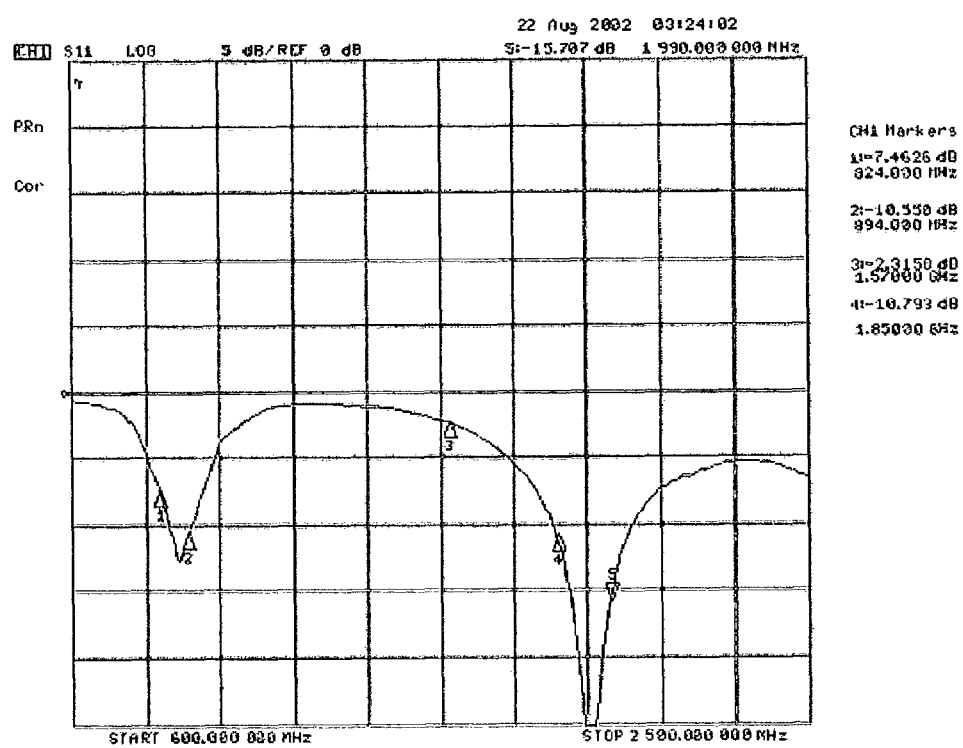
FIG. 33 illustrates an exemplary return loss graph for the fourth IFA dual band antenna configuration, in accordance with an aspect of the present invention.

Next at FIG. 33, a return loss graph 3700 for the fourth antenna configuration 3500 is illustrated. At 3710, 824 MHz corresponds to a return loss of −7.4626 dB. At 3720, 894 MHz corresponds to a return loss of −10.550 dB. At 3730, 1570 MHz corresponds to a return loss of −2.3158 dB. At 3740, 1850 MHz corresponds to a return loss of −10.793 dB. At 3750, 1990 MHz corresponds to a return loss of about −15.707 dB.

Figure 34:
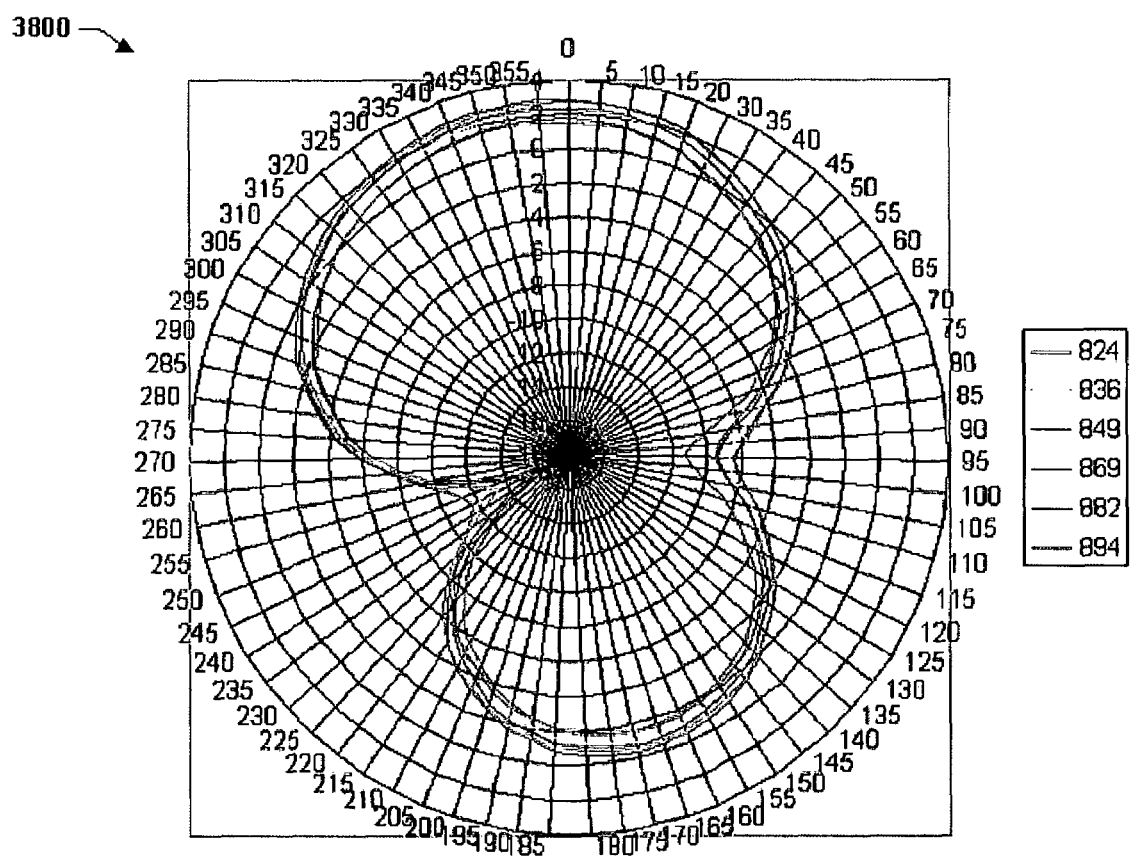
FIG. 34 illustrates an exemplary cellular electromagnetic pattern for the fourth IFA dual band antenna configuration, in accordance with an aspect of the present invention.
Figure 35:
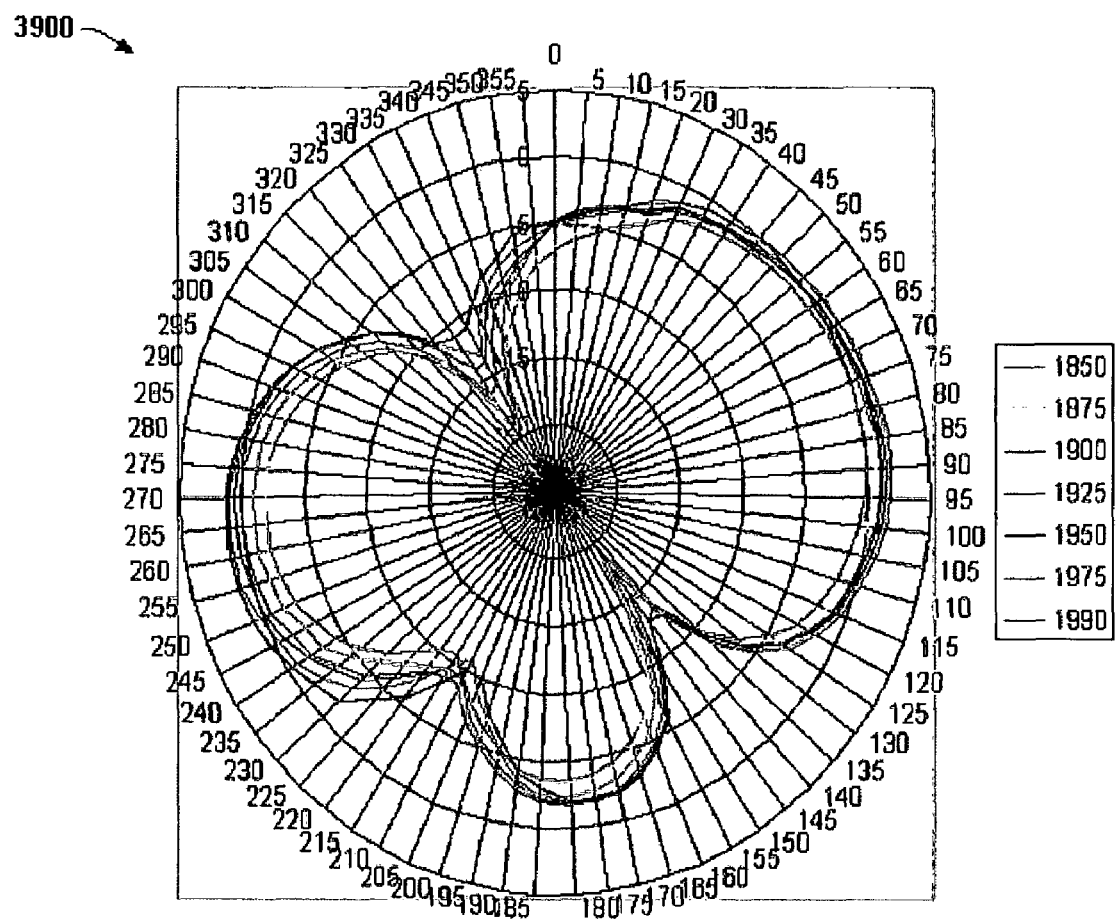
FIG. 35 illustrates an exemplary PCS electromagnetic pattern for the fourth IFA dual band antenna configuration, in accordance with an aspect of the present invention.

FIGS. 34 and 35 illustrate cellular and PCS electromagnetic patterns for the fourth antenna configuration 3700. FIG. 34 illustrates the electromagnetic pattern 3800 for the cellular band. As illustrated, an approximate maximum gain for the exemplary electromagnetic pattern 3800 is about 3 dBi. At FIG. 35, the electromagnetic pattern 3900 for the PCS band is depicted. The approximate maximum gain for the exemplary electromagnetic pattern 3900 is about 2.5 dBi.

What has been described above includes examples of the present invention. It is, Of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An apparatus comprising: a printed wiring board; a code division multiple access antenna fully integrated within the printed wiring board, wherein the code division multiple access antenna comprises an inverted F antenna and a loop antenna; a global positioning system antenna; and a conductor separate from and disposed between the fully integrated code division multiple access antenna and the global positioning system antenna to mitigate coupling between antennas, wherein the global positioning system antenna comprises a global positioning system assembly in close arrangement to the printed wiring board, wherein the global positioning system assembly has a contact to interface to the printed wiring board.

2. The apparatus of claim 1, wherein the conductor is coupled electrically at one end to ground and is electrically open on an opposite end.

3. The apparatus of claim 1, wherein the global positioning system assembly comprises at least a radiating element to receive signals and a carrier to house the radiating element, wherein the contact is a spring contact.

4. The apparatus of claim 3, wherein the carrier is constructed of plastic.

5. The apparatus of claim 1, wherein at least one of the antennas comprises a gamma match.

6. The apparatus of claim 5, wherein the gamma match further provides for global positioning system antenna impedance matching.

7. The apparatus of claim 1, wherein the printed wiring board comprises the global positioning system antenna and the conductor.

8. The apparatus of claim 7, wherein the printed wiring board further comprises a bluetooth antenna.

9. An antenna system comprising: a code division multiple access antenna, wherein the code division multiple access antenna comprises an inverted F antenna and a loop antenna; a global positioning system antenna; a third antenna to communicate with one or more devices employing a personal area network technology; at least one conductor separate from and disposed between antennas to mitigate coupling between antennas; and, a printed wiring board into which the code division multiple access antenna is fully integrated, wherein the fully integrated code division multiple access antenna; the global positioning system antenna; and the third antenna is configured to operate with the printed wiring board.

10. The system of claim 9, wherein the conductor is constructed 8 mm in length.

11. The system of claim 9, the fully integrated code division multiple access antenna employing a capacitive tap to facilitate configuring the fully integrated code division multiple access antenna to transmit and receive signals within a first frequency band.

12. The system of claim 9, the global positioning system antenna employing an impedance matching stub to match antenna impedance and to facilitate configuring the global positioning system antenna to transmit and receive signals within a second frequency band.

13. The system of claim 9, the third antenna employing a gamma match to facilitate configuring the third antenna to receive signals.

14. The system of claim 9, wherein the conductor is coupled electrically at one end to ground and is electrically open ended on an opposite end.

15. The system of claim 9, wherein the global positioning system antenna comprises a global positioning system antenna assembly, wherein the global positioning system antenna assembly comprises a spring contact that is operatively arranged with respect to a spring contact point on the printed wiring board.

16. The antenna system of claim 9, wherein the printed wiring board comprises the global positioning system antenna and the conductor.

17. The antenna system of claim 16, wherein the printed wiring board further comprises a bluetooth antenna.

18. An apparatus comprising: a printed wiring board; a code division multiple access antenna fully integrated within the printed wiring board, wherein the code division multiple access antenna comprises an inverted F antenna and a loop antenna operable at a plurality of frequency bands, a global positioning system antenna, and a third antenna therein; a reflector coupled to a printed wiring board; a mobile communication device shell to enclose the printed wiring board and the reflector; and, a cover to facilitate securing the printed wiring board within the mobile communication device shell, wherein the global positioning system antenna comprises a global positioning system assembly in close arrangement to the printed wiring board, wherein the global positioning system assembly has a contact to interface to the printed wiring board.

19. The apparatus of claim 18, the reflector employed to reduce the amount of electromagnetic reflection.

20. The apparatus of claim 18, the mobile communication device shell employed in a side phone configuration.

21. The apparatus of claim 18, wherein the printed wiring board comprises the global positioning system antenna and the conductor.

22. The apparatus of claim 21, wherein the printed wiring board further comprises a bluetooth antenna.

23. A method comprising:
providing a printed wiring board in a mobile device;
providing a code division multiple access antenna for the mobile device fully integrated within the printed wiring board, wherein the code division multiple access antenna comprises an inverted F antenna and a loop antenna;
providing a global positioning system antenna for the mobile device; and
providing a conductor separate from and disposed between at least two of the antennas to mitigate coupling between antennas, wherein the global positioning system antenna comprises a global positioning system assembly in close arrangement the printed wiring board, wherein the global positioning system assembly has a contact to interface to the printed wiring board.

24. The method of claim 23, wherein the conductor is coupled electrically at one end to ground and is electrically open at an opposite end.

25. The method of claim 23, wherein the global positioning system assembly comprises at least a radiating element to receive signals and a carrier to house the radiating element, wherein the contact is a spring contact.

26. The apparatus of claim 23, wherein the antennas are constructed of conductive material.

27. The method of claim 23, wherein the printed wiring board comprises the global positioning system antenna and the conductor.

28. The method of claim 27, wherein the printed wiring board further comprises a bluetooth antenna.

29. An apparatus comprising:
a printed wiring board;
first means for receiving a code division multiple access wireless signal, the first means being comprised of an inverted F antenna and a loop antenna, the first means being fully integrated within the printed wiring board;
second means for receiving a global positioning system wireless signal, wherein the second means has a contact to interface to a printed wiring board; and
means for mitigating coupling between the first and second means for receiving a wireless signal, wherein the means for mitigating coupling is separate from and disposed between the first and second means.

30. The apparatus of claim 29, wherein the wireless signal received by the first means occupies a frequency band that is different from the frequency band the wireless signal received by the second means.

31. The apparatus of claim 30, wherein the means for mitigating coupling is a conductor that is electrically grounded on one end and electrically open on an opposite end.

32. The apparatus of claim 31, wherein the first means for receiving is a first antenna and the second means for receiving is a second antenna.

33. The apparatus of claim 32, wherein the first antenna is a fully integrated code division multiple access antenna.

34. The apparatus of claim 32, wherein the second antenna is a global positioning system antenna.

35. The apparatus of claim 29, wherein the printed wiring board comprises the second means and the means for mitigating coupling.

36. The method of claim 35, wherein the printed wiring board further comprises a bluetooth antenna.

* * * * *